(12) United States Patent
Zhu et al.

(10) Patent No.: US 12,228,637 B2
(45) Date of Patent: Feb. 18, 2025

(54) RADAR DEVICE AND METHOD

(71) Applicant: KABUSHIKI KAISHA TOSHIBA, Tokyo (JP)

(72) Inventors: Xu Zhu, Kawasaki Kanagawa (JP); Hiroki Mori, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 458 days.

(21) Appl. No.: 17/678,112

(22) Filed: Feb. 23, 2022

(65) Prior Publication Data

US 2023/0069118 A1   Mar. 2, 2023

(30) Foreign Application Priority Data

Aug. 31, 2021 (JP) ................................. 2021-141121

(51) Int. Cl.
*G01S 13/89* (2006.01)
*G01S 7/04* (2006.01)
(Continued)

(52) U.S. Cl.
CPC ............... *G01S 13/89* (2013.01); *G01S 7/04* (2013.01); *H01Q 21/061* (2013.01); *H01Q 21/08* (2013.01)

(58) Field of Classification Search
CPC .... G01S 13/931; G01S 13/4463; G01S 13/89; G01S 13/887; G01S 2013/0245;
(Continued)

(56) References Cited

U.S. PATENT DOCUMENTS 8,698,681 B2 * 4/2014 Leung ................. H01Q 9/0457
343/832
9,466,879 B2 * 10/2016 Leung ..................... H01Q 1/48
(Continued)

FOREIGN PATENT DOCUMENTS

JP     2015204576 A    11/2015
JP     2020085461 A     6/2020
(Continued)

OTHER PUBLICATIONS

Liang, et al., "Accurate Near-Field Millimeter-Wave Imaging of Concave Objects—A Case Study of Dihedral Structures Under Monostatic Array Configurations", IEEE Transactions on Geoscience and RemoteSensing (vol. 58, No. 5), 2020, pp. 3469-3483,.
(Continued)

*Primary Examiner* — Ladimir Magloire
*Assistant Examiner* — Michael W Justice
(74) *Attorney, Agent, or Firm* — Holtz, Holtz & Volek PC

(57) ABSTRACT

According to one embodiment, a radar device includes antenna panels. The antenna panels include a first transmission panel, first reception panel, and second reception panel, or the antenna panels include a first transmission panel, second transmission panel, and first reception panel. The first transmission panel includes antennas at intervals of m times a substantially half wavelength where m is a positive integer of two or more. The first reception panel includes antennas at intervals of n times the substantially half wavelength where n is a positive integer of two or more, and m and n are coprime to each other.

8 Claims, 26 Drawing Sheets

(51) Int. Cl.
*H01Q 21/06* (2006.01)
*H01Q 21/08* (2006.01)

(58) Field of Classification Search
CPC .......... G01S 2013/0254; H01Q 1/3233; H01Q 21/061; H01Q 21/293; H01Q 21/08
USPC .................................................. 342/70, 179
See application file for complete search history.

(56) References Cited

U.S. PATENT DOCUMENTS

| | | | | |
|---|---|---|---|---|
| 9,869,762 | B1* | 1/2018 | Alland | H01Q 21/08 |
| 10,481,249 | B2* | 11/2019 | Alenljung | G01S 7/354 |
| 10,706,569 | B2* | 7/2020 | Harris | G06T 7/596 |
| 11,448,723 | B2* | 9/2022 | Kitamura | H01Q 21/061 |
| 11,460,567 | B2* | 10/2022 | Amani | G01S 13/872 |
| 11,644,565 | B2* | 5/2023 | Li | G01S 13/872 |
| | | | | 342/43 |
| 11,677,159 | B2* | 6/2023 | Zhu | H01Q 21/28 |
| | | | | 342/25 A |
| 11,714,180 | B2* | 8/2023 | Zhang | G01S 13/4454 |
| | | | | 342/149 |
| 11,822,002 | B2* | 11/2023 | Kishigami | H01Q 21/08 |
| 2011/0260936 | A1* | 10/2011 | Leung | H01Q 1/44 |
| | | | | 343/904 |
| 2014/0176375 | A1* | 6/2014 | Leung | H01Q 1/48 |
| | | | | 343/720 |
| 2015/0287235 | A1* | 10/2015 | Rose | H01Q 21/00 |
| | | | | 345/424 |
| 2016/0285172 | A1* | 9/2016 | Kishigami | G01S 13/4463 |
| 2017/0139042 | A1* | 5/2017 | Alenljung | G01S 7/354 |
| 2017/0324162 | A1* | 11/2017 | Khachaturian | H01Q 21/0087 |
| 2017/0358099 | A1* | 12/2017 | Harris | H04N 7/185 |
| 2019/0089460 | A1 | 3/2019 | Khachaturian et al. | |
| 2019/0242990 | A1 | 8/2019 | Daisy et al. | |
| 2020/0103495 | A1* | 4/2020 | Iwasa | G01S 13/325 |
| 2020/0161775 | A1* | 5/2020 | Zhu | H01Q 21/28 |
| 2020/0355788 | A1* | 11/2020 | Kitamura | G01S 13/42 |
| 2020/0393594 | A1 | 12/2020 | Obata et al. | |
| 2021/0373144 | A1* | 12/2021 | Amani | G01S 13/34 |
| 2022/0163623 | A1* | 5/2022 | Kishigami | H01Q 21/065 |
| 2022/0244370 | A1* | 8/2022 | Zhang | G01S 13/003 |
| 2022/0244377 | A1 | 8/2022 | Ariyoshi et al. | |

FOREIGN PATENT DOCUMENTS

| | | |
|---|---|---|
| JP | 2020204513 A | 12/2020 |
| WO | 2021014536 A1 | 1/2021 |

OTHER PUBLICATIONS

Zhuge, et al., "Study on Two-Dimensional Sparse Mimo Uwb Arrays for High Resolution Near-Field Imaging", IEEE Transactions on Antennas and Propagation (vol. 60, No. 9), 2012, pp. 4173-4182.

Japanese Decision to Grant a Patent (and an English language translation thereof) dated Jul. 2, 2024, issued in counterpart Japanese Application No. 2021-141121.

* cited by examiner

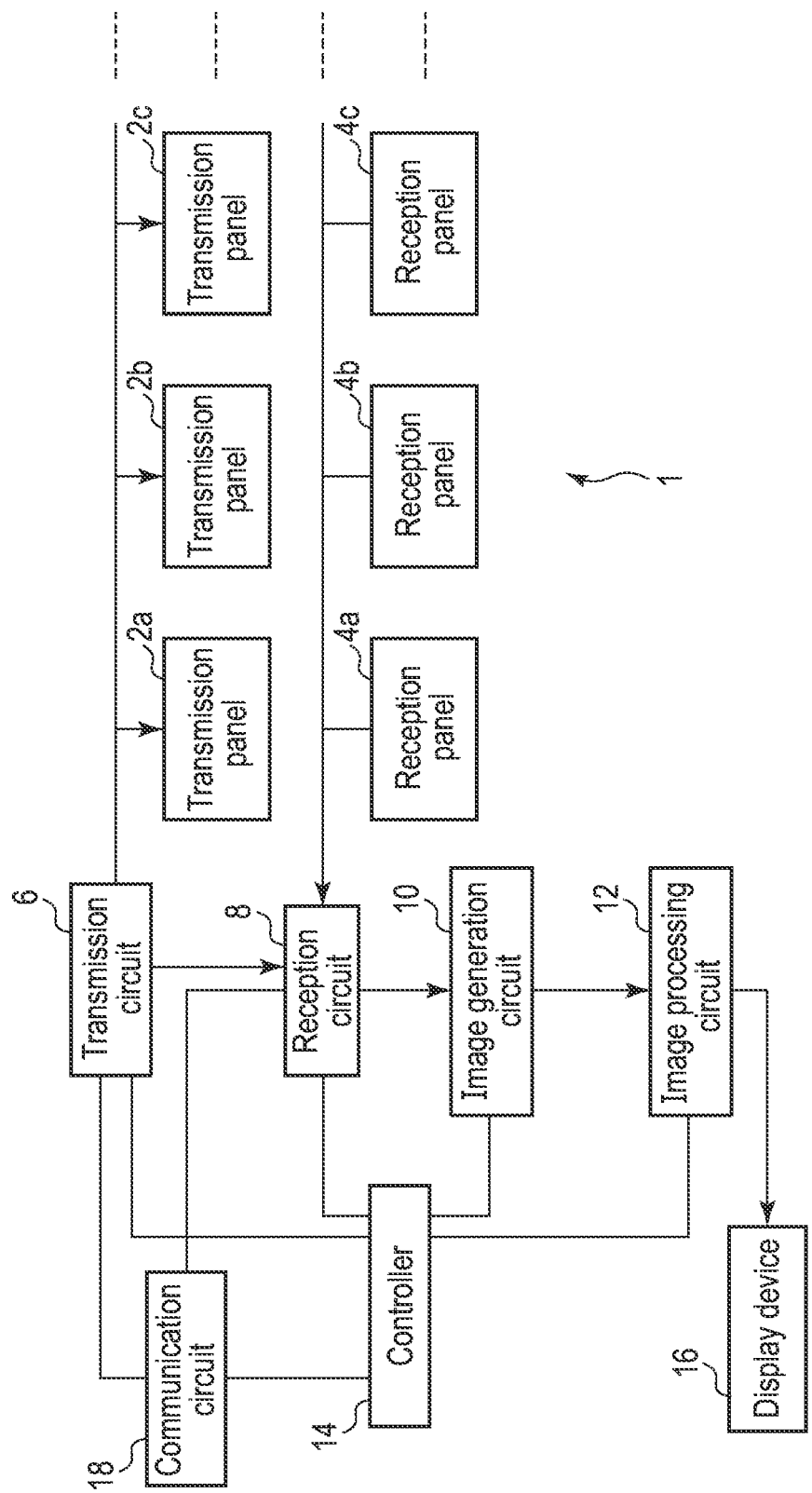
F I G. 1

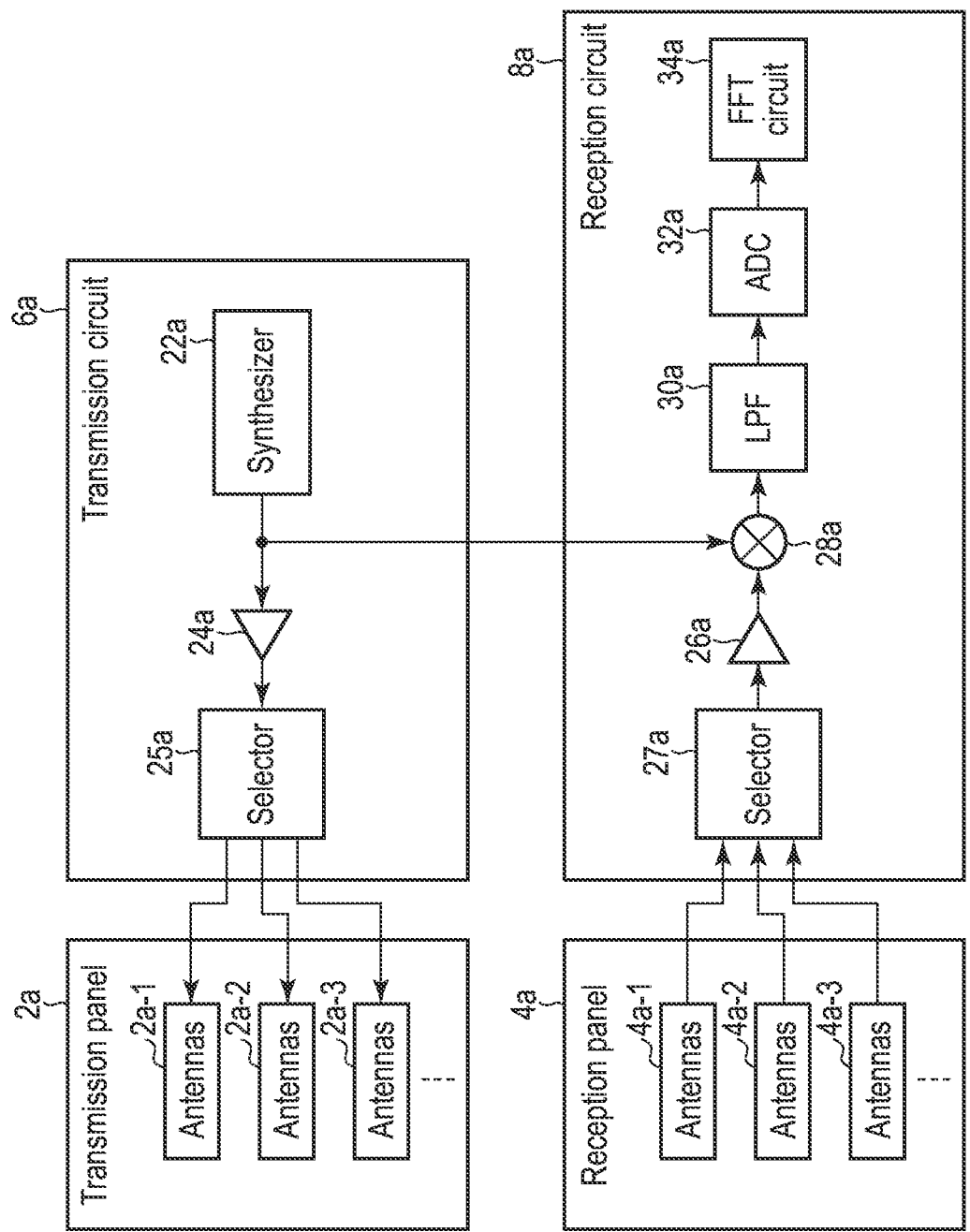
F I G. 2

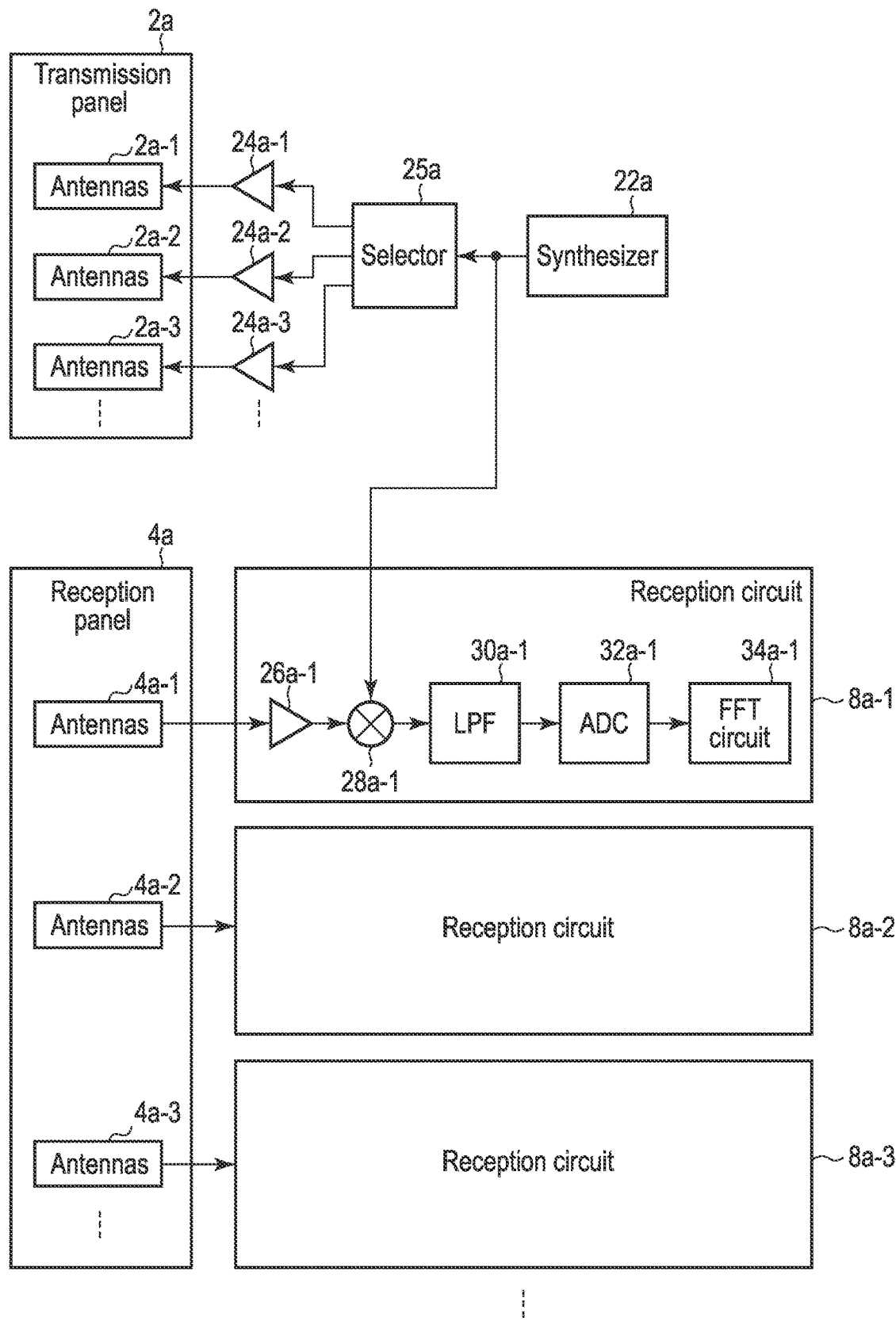
F I G. 3

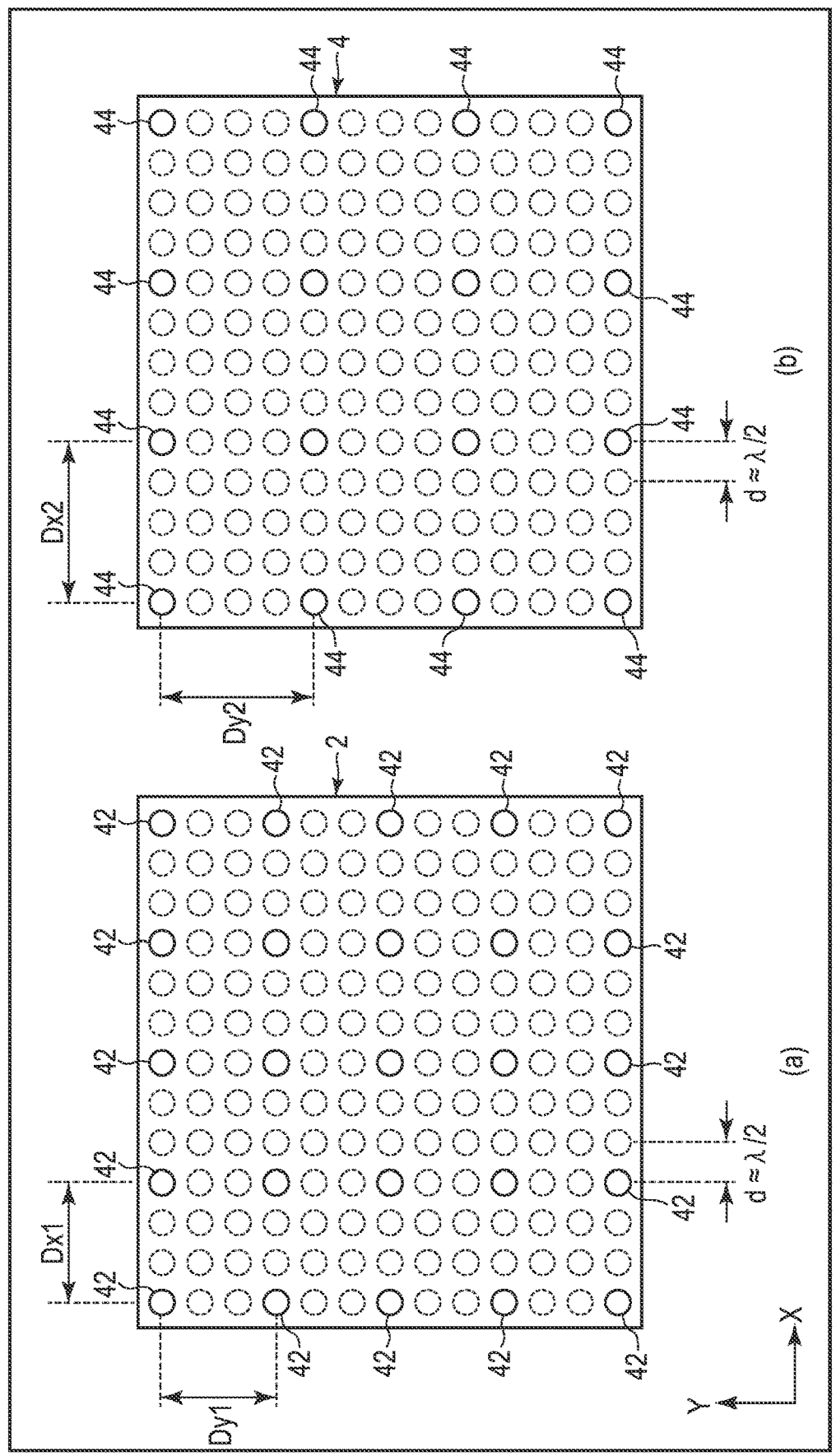
F I G. 7

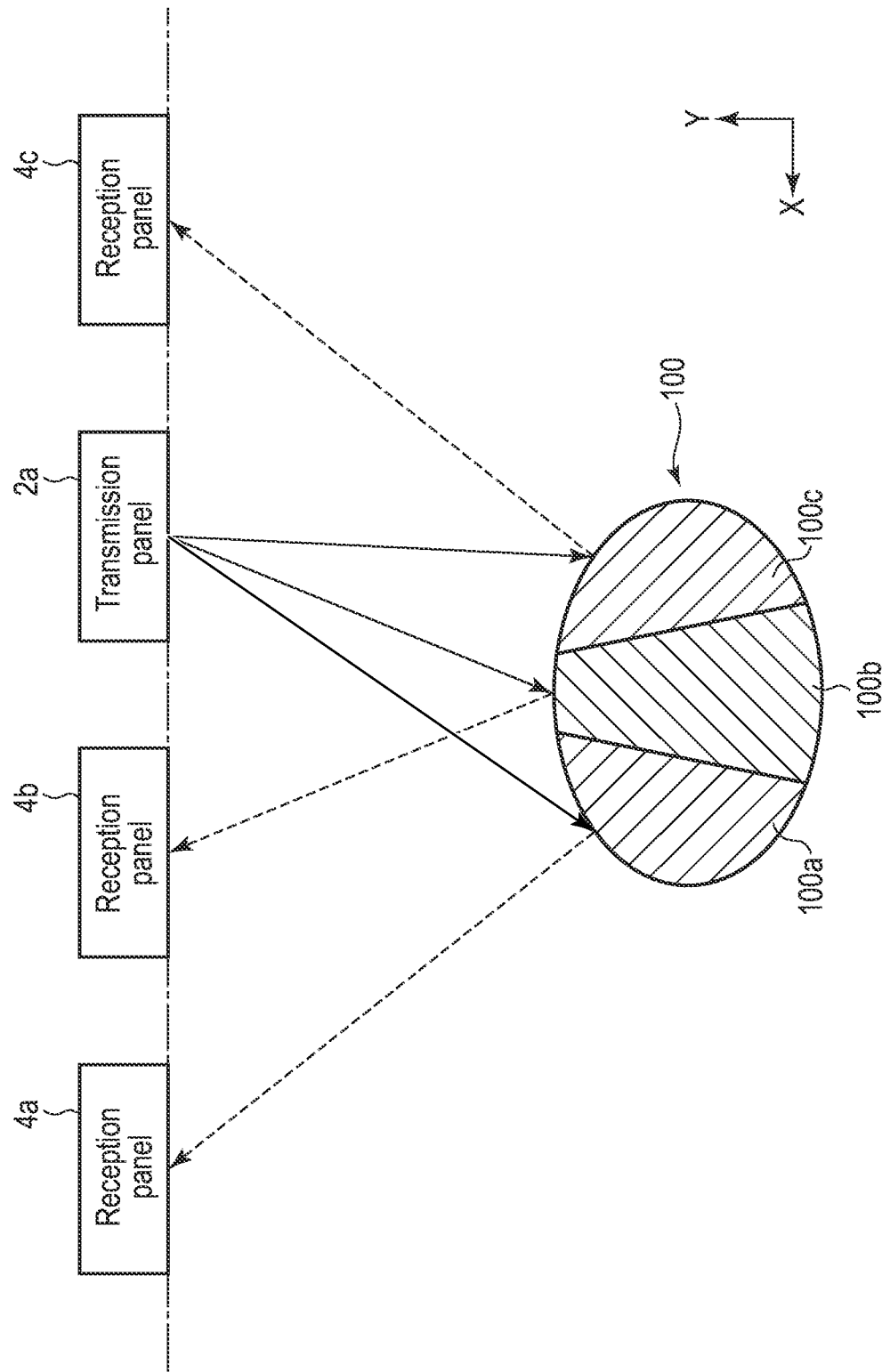
F I G. 13

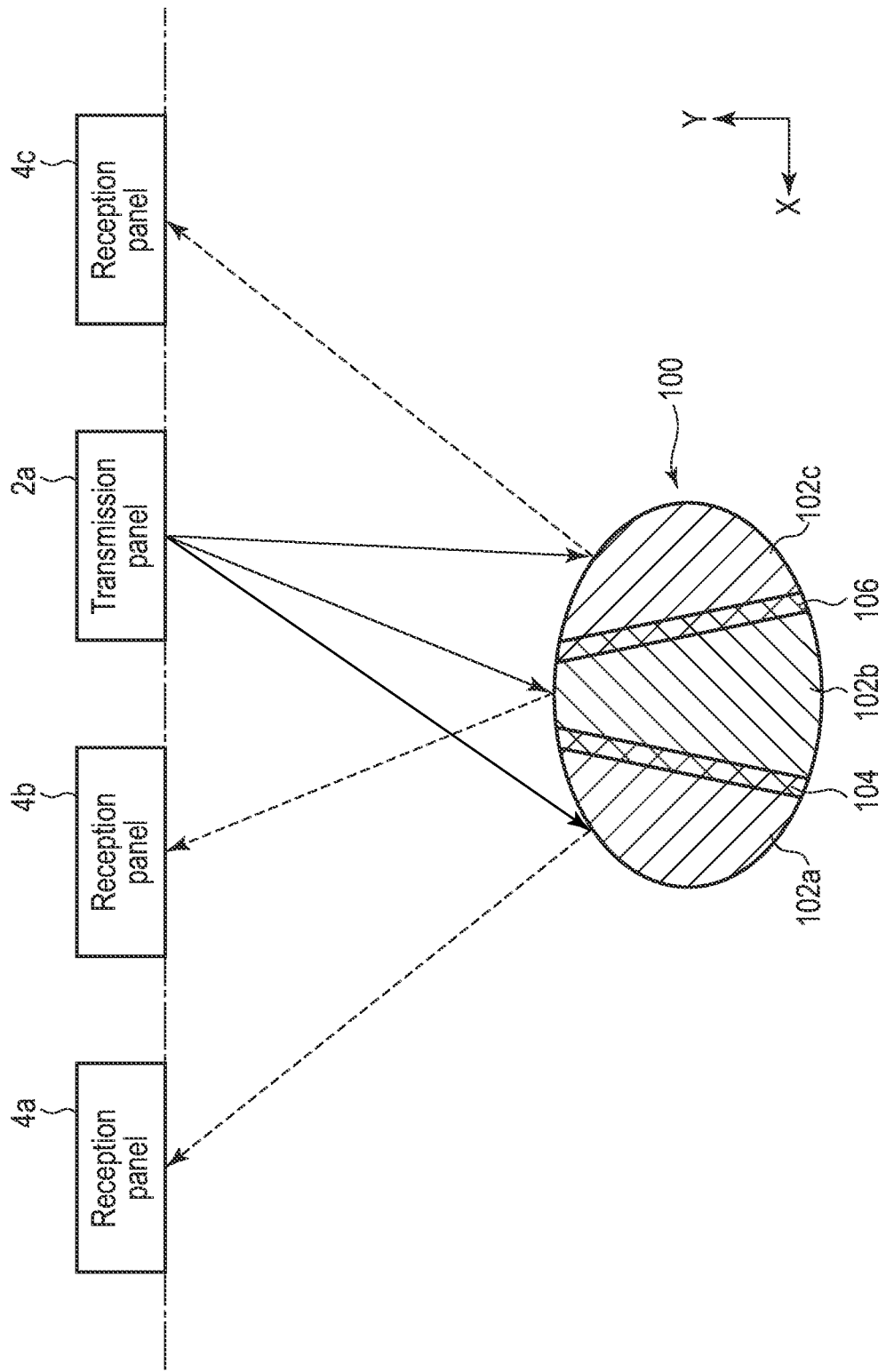
F I G. 14

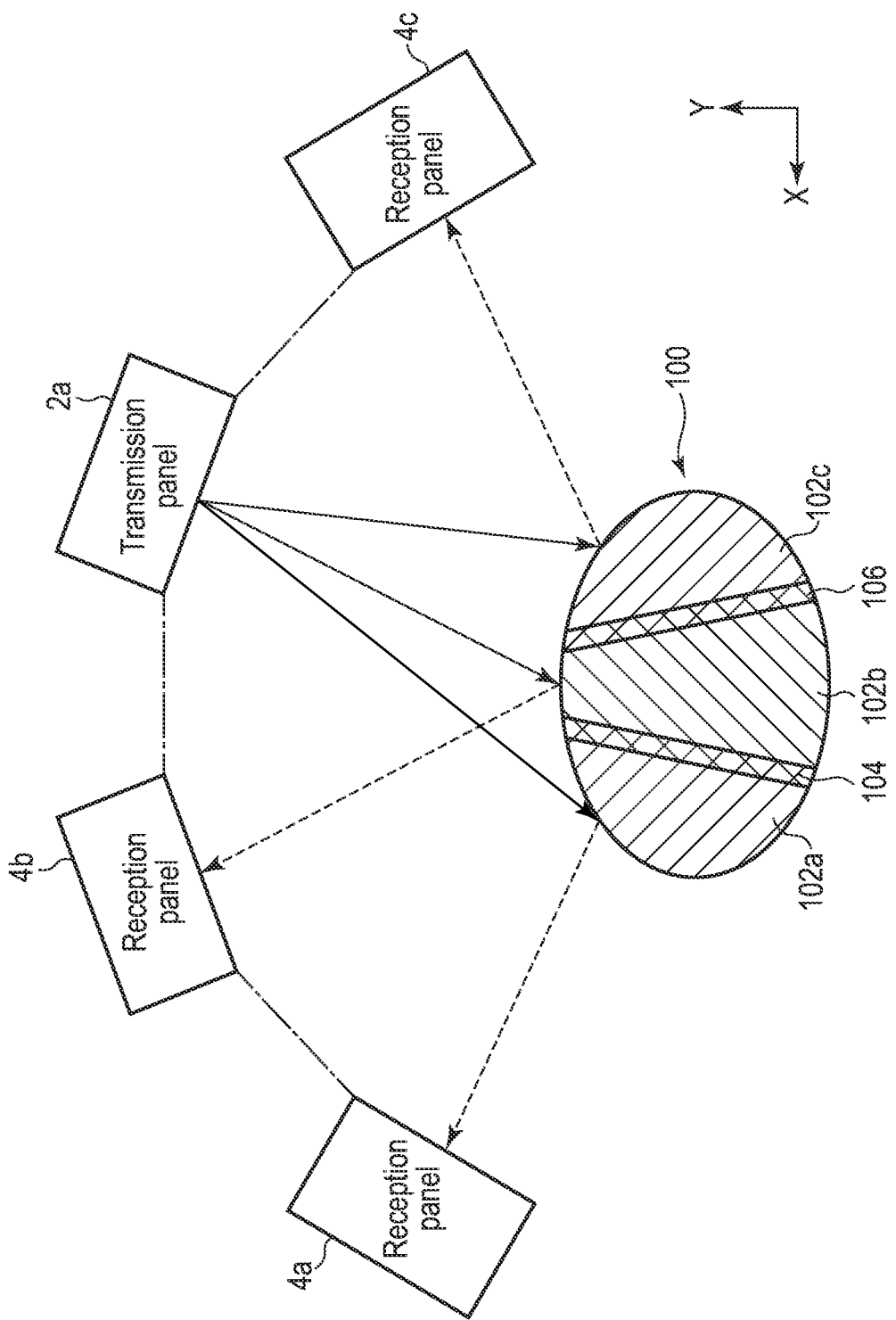
F I G. 16

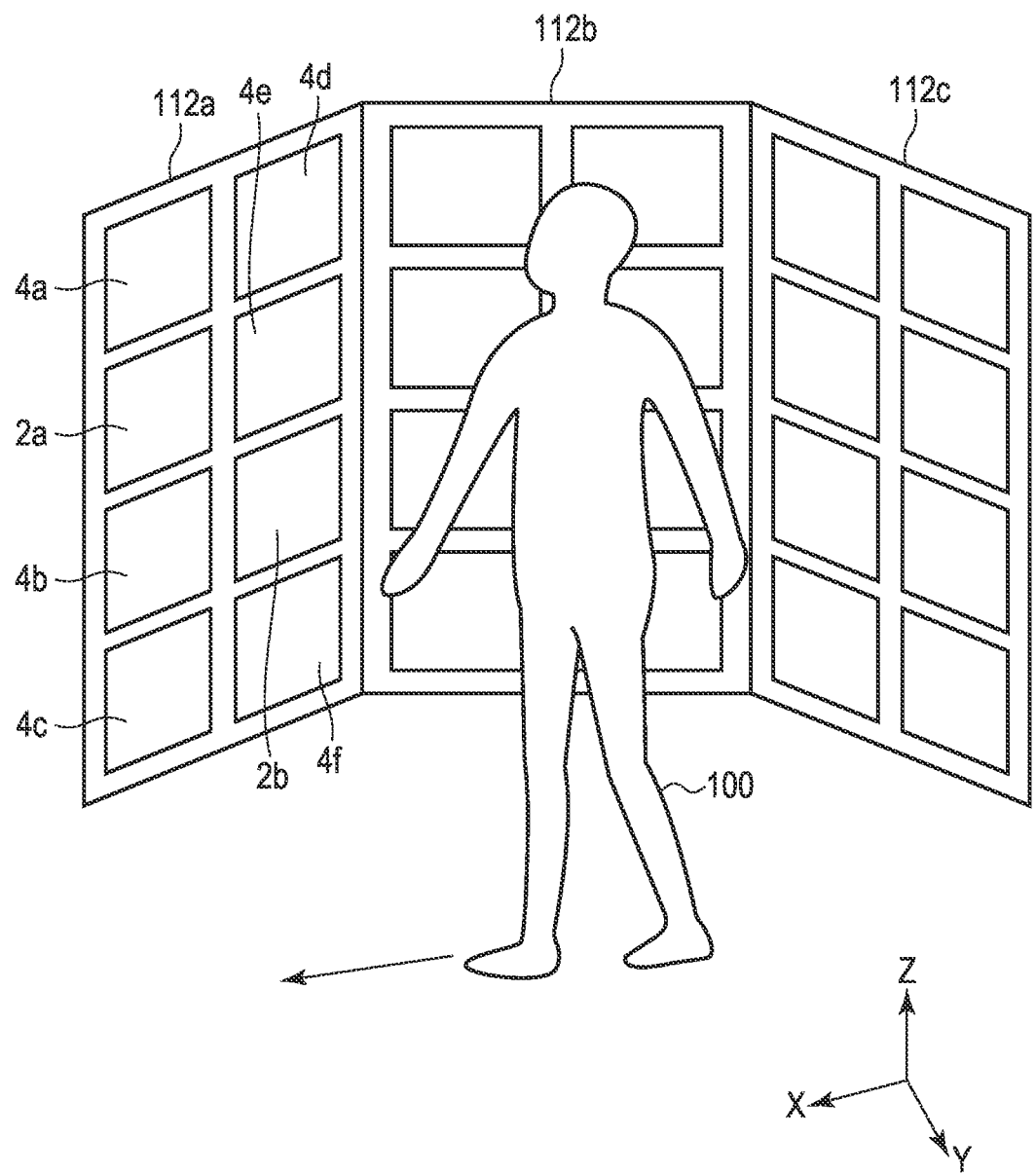
F I G. 20

RADAR DEVICE AND METHOD

CROSS-REFERENCE TO RELATED APPLICATIONS

This application is based upon and claims the benefit of priority from Japanese Patent Application No. 2021-141121, filed Aug. 31, 2021, the entire contents of which are incorporated herein by reference.

FIELD

Embodiments described herein relate generally to a radar device and method.

BACKGROUND

A radar device that inspects whether an inspection target person (hereinafter referred to as a subject) holds a dangerous article has been proposed. The radar device radiates an electromagnetic wave to the subject, receives a reflected wave from the subject, and determines whether the subject holds the dangerous article based on the reflected wave.

Since the electromagnetic wave is reflected in many directions on the surface of the subject, many antennas are required to inspect the entire subject without generating a blind spot, and the configuration of the radar device is complicated. In addition, since transmission and reception are performed with many antennas, an inspection time is long.

BRIEF DESCRIPTION OF THE DRAWINGS

FIG. 1 is a diagram illustrating an example of a configuration of a radar device according to an embodiment.

FIG. 2 is a block diagram illustrating an example of an electrical configuration of a transmission circuit and reception circuit according to the embodiment.

FIG. 3 is a block diagram illustrating another example of an electrical configuration of a transmission circuit and reception circuit according to the embodiment.

FIG. 7 illustrates the principle of an array antenna of a transmission panel and reception panel according to the embodiment.

FIG. 13 illustrates a first example of an arrangement of at least one transmission panel and a plurality of reception panels with respect to a subject according to the embodiment.

FIG. 14 illustrates a second example of an arrangement of at least one transmission panel and a plurality of reception panels with respect to a subject according to the embodiment.

FIG. 16 illustrates a fourth example of an arrangement of at least one transmission panel and a plurality of reception panels with respect to a subject according to the embodiment.

FIG. 20 illustrates an eighth example of a radar device includes at least one transmission panel and a plurality of reception panels according to the embodiment.

DETAILED DESCRIPTION

Figure 4A:
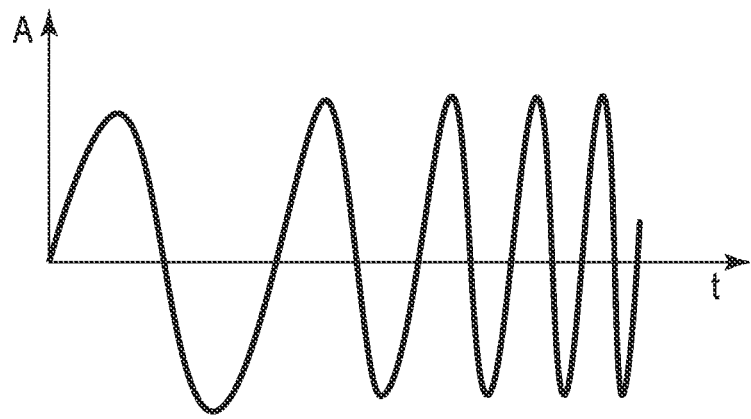
FIG. 4A and FIG. 4B illustrate a chirp signal.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a radar device includes antenna panels. The antenna panels include a first transmission panel, first reception panel, and second reception panel, or the antenna panels include a first transmission panel, second transmission panel, and first reception panel. The first transmission panel includes antennas at intervals of m times a substantially half wavelength where m is a positive integer of two or more. The first reception panel includes antennas at intervals of n times the substantially half wavelength where n is a positive integer of two or more, and m and n are coprime to each other.

A radar device according to an embodiment is installed in a facility such as an airport, a station, an airport, a shopping mall, a concert hall, and an exhibition hall and is used for security inspection as to whether or not a subject (a user of the facility) holds a dangerous article. For example, the subject is scanned when electromagnetic waves are sequentially radiated to respective points of the subject, and the electromagnetic waves reflected by the points of the subject are sequentially received. An image including the subject is generated based on the reception signal obtained by the scanning. A manager of the facility can determine whether the subject holds the dangerous article, whether the dangerous article is hidden by the belongings of the subject, or the like by checking the image.

FIG. 1 is a diagram illustrating an example of a configuration of a radar device 1 according to the embodiment. The radar device 1 includes a plurality of transmission panels 2a, 2b, 2c, and so on, a plurality of reception panels 4a, 4b, 4c, and so on, a transmission circuit 6, a reception circuit 8, an image generation circuit 10, an image processing circuit 12, a controller 14, a communication circuit 18, and a display device 16. When it is not necessary to distinguish the transmission panels 2a, 2b, 2c, and so on individually, the transmission panels 2a, 2b, 2c, and so on are referred to as a transmission panel 2. When it is not necessary to distinguish the reception panels 4a, 4b, 4c, and so on individually, the reception panels 4a, 4b, 4c, and so on are referred to as a reception panel 4. Both the number of the transmission panels 2 and the number of the reception panels 4 do not need to be plural, and either one may be singular. Each of the transmission panel 2 and the reception panel 4 includes a linear array antenna including a plurality of antennas one-dimensionally arranged on a substrate, or a plane array antenna or a planar array antenna (hereinafter, referred to as a planar array antenna) including a plurality of antennas two-dimensionally arranged on the substrate. The substrate may be a planar substrate or a curved substrate. An example of the antenna is a microstrip antenna.

The plurality of antennas included in each of the transmission panels 2a, 2b, 2c, and so on perform transmission, for example, time-division transmission with electromagnetic waves to be orthogonal to each other. The time division transmission may be a simple cyclic method in which a first antenna, a second antenna, and so on included in the transmission panel 2a, a first antenna, a second antenna, and so on included in the transmission panel 2b, a first antenna, a second antenna, and so on included in the transmission panel 2c are transmitted in this order. Alternatively, the controller 14 may adjust the antenna of the transmission panel 2 that performs radar transmission at a certain timing to perform the time-division transmission.

The transmission panel 2 is connected to the transmission circuit 6. Although not illustrated in FIG. 1, the transmission circuit 6 may include a plurality of transmission circuits connected to each transmission panel 2a, 2b, 2c, and so on. The transmission panels 2a, 2b, 2c, and so on are arranged at various positions and radiate electromagnetic waves to the subject in various directions. The reception panel 4 is connected to the reception circuit 8. The reception circuit 8 may also include a plurality of reception circuits respectively connected to the reception panels 4a, 4b, 4c, and so on. The reception panels 4a, 4b, 4c, and so on are also arranged at various positions to receive reflected waves from the subject in various directions. When at least one transmission panel 2 and a plurality of reception panels 4 are arranged at various positions around the subject, or when a plurality of transmission panels 2 and at least one reception panel 4 are arranged at various positions around the subject, the entire subject can be inspected.

The radar device 1 may perform inspection by constantly radiating electromagnetic waves to the entire predetermined inspection area. Alternatively, the radar device 1 may include a camera that captures an image of the subject positioned in the inspection area, recognize the subject from the image of the inspection area captured by the camera, and radiate electromagnetic waves only to the recognized subject when recognizing the subject.

As the electromagnetic wave used in the embodiment, an electromagnetic wave having a wavelength of 1 mm to 30 mm may be used. An electromagnetic wave having a wavelength of 1 mm to 10 mm is referred to as a millimeter wave. An electromagnetic wave having a wavelength of 10 mm to 100 mm is referred to as a microwave. In addition, an electromagnetic wave referred to as a terahertz wave, having a wavelength of 100 micrometers to 1 millimeter may be used.

The radar device 1 repeats the radiation of electromagnetic waves while changing a radiation direction, and radiates electromagnetic waves to a plurality of points of the subject to scan the subject with the electromagnetic waves. When the electromagnetic wave is radiated, the electromagnetic wave is reflected by an object present on a propagation path of the electromagnetic wave. The radar device 1 can determine whether an object present at a certain distance is a human being or a dangerous article such as a handgun or an explosive by measuring the reflection intensity of the electromagnetic wave reflected at the certain distance. The radar device 1 outputs the determination result as an alarm sound or the like.

The image generation circuit 10 generates partial images of at least parts of the subject based on the reception signals of the reception panels 4a, 4b, 4c, and so on output from the reception circuit 8. The image processing circuit 12 adds the partial images to generate a composite image. The display device 16 displays the composite image. Since the composite image also includes the image of the dangerous article carried by the subject, the operator of the radar device 1 can determine whether or not the subject carries the dangerous article by observing the image.

The controller 14 controls the operations of the transmission circuit 6, reception circuit 8, image generation circuit 10, image processing circuit 12, and communication circuit 18.

Several circuits, for example, the image generation circuit 10 and image processing circuit 12 may be included in an external device of the radar device 1, for example, a server. The communication circuit 18 may communicate with the external device, transmit the output of the reception circuit 8 to an image generation/processing circuit in the external device, and receive a composite image which is the processing result of the image generation/processing circuit. In addition, the communication circuit 18 may transmit the composite image to a server in the radar device or outside the radar device, and store the composite image in a database of the server. In addition, the display device 16 may also be provided outside the radar device 1.

Several circuits, for example, the image generation circuit 10, image processing circuit 12, and controller 14 may be combined and implemented as one circuit. Some circuits, for example, the image generation circuit 10, image processing circuit 12, and controller 14 may be implemented by software.

FIG. 2 is a block diagram illustrating an example of an electrical configuration of the transmission circuit 6 and reception circuit 8. The transmission circuit 6 is provided for each transmission panel 2. The reception circuit 8 is provided for each reception panel 4. FIG. 2 illustrates a transmission circuit 6a connected to the transmission panel 2a and a reception circuit 8a connected to the reception panel 4a. The transmission panel 2a includes antennas 2a-1, 2a-2, 2a-3, and so on. The reception panel 4a includes antennas 4a-1, 4a-2, 4a-3, and so on.

The transmission circuit 6a includes a synthesizer 22a, power amplifier 24a, and selector 25a. The signal generated by the synthesizer 22a is amplified by the power amplifier 24a and then input to the selector 25a. The selector 25a includes an input terminal and a plurality of output terminals, and selectively connects the input terminal to any of the plurality of output terminals. The output of the power amplifier 24a is sequentially supplied to any one of the antennas 2a-1, 2a-2, 2a-3, and so on via the selector 25a. Accordingly, electromagnetic waves are radiated from the antennas 2a-1, 2a-2, 2a-3, and so on of the transmission panel 2a to the inspection area in a time-division manner. The radiated electromagnetic waves are reflected by all objects existing in the inspection area, and the reflected waves are received by the reception panel 4.

The transmission circuit 6a also includes a clock generator (not shown) that generates a clock signal for controlling the operation timing of the transmission circuit 6a, and also transmits the clock signal to the reception circuit 8a to control the operation timing of the reception circuit 8a. Accordingly, the transmission circuit 6a and the reception circuit 8, can perform transmission and reception in synchronization.

The reception circuit 8a includes a selector 27a, low noise amplifier 26a, mixer 28a, low-pass filter (LPF) 30a, A/D converter (ADC) 32a, and fast Fourier transformation (FFT) circuit 34a. The reception signal output from any one of the antennas 4a-1, 4a-2, 4a-3, and so on included in the reception panel 4a is input to the selector 27a. The selector 27a includes an input terminal and a plurality of output terminals, and selectively connects the input terminal to any of the plurality of output terminals. Accordingly, the reception signals output from the antennas 4a-1, 4a-2, 4a-3, and so on are sequentially input to the first input terminal of the mixer 28a via the low noise amplifier 26. The output signal of the synthesizer 22a is input to the second input terminal of the mixer 28a. The connection between the synthesizer 22a and the mixer 28a may be a wired connection via a signal line or may be a wireless connection via a wireless network. The mixer 28a mixes the transmission signal of the synthesizer 22a and the reception signals of the reception panel 4 to generate an intermediate frequency (IF) signal.

The intermediate frequency signal is input to the A/D converter 32a via the low-pass filter 30a. The digital signal output from the A/D converter 32a is analyzed by the FFT circuit 34, and the reflection intensity of the electromagnetic wave of the object is obtained as described later.

A transmission circuit similar to the transmission circuit 6a is connected to each of the other transmission panels 2b, 2c, and so on. A reception circuit similar to the reception circuit 8a is connected to each of the other reception panels 4b, 4c, and so on.

FIG. 3 is a block diagram illustrating another example of the electrical configuration of the transmission circuit 6 and the reception circuit 8. In FIG. 3, a plurality of power amplifiers 24a-1, 24a-2, 24a-3, and so on are respectively connected to the plurality of antennas 2a-1, 2a-2, 2a-3, and so on included in the transmission panel 2a. A plurality of reception circuits 8a-1, 8a-2, 8a-3, and so on are respectively connected to the plurality of antennas 4a-1, 4a-2, 4a-3, and so on included in the reception panel 4a. Each of the reception circuits 8a-1, 8a-2, 8a-3, and so on has the same configuration as the reception circuit 8a.

On a transmission side, the output of a synthesizer 22a is sequentially supplied to any one of the plurality of power amplifiers 24a-1, 24a-2, 24a-3, and so on via a selector 25a. In FIG. 2, the synthesizer 22a, the power amplifier 24a, and the selector 25a configure the transmission circuit 6a. In FIG. 3, each of the power amplifiers 24a-1, 24a-2, 24a-3, and so on corresponds to the transmission circuit 6a.

Also for each of the other transmission panels 2b, 2c, and so on, power amplifiers similar to the power amplifiers 24a-1, 24a-2, 24a-3, and so on and a selector similar to the selector 25a are connected. A reception circuit similar to the reception circuits 8a-1, 8a-2, 8a-3, and so on is connected to each of the other reception panels 4b, 4c, and so on.

In FIG. 3, the synthesizer 22a is provided for the transmission panel 2a, and the output of the synthesizer 22a is transmitted to the transmission panel 2a and reception circuits 8s-1, 8a-2, 8a-3, and so on of the reception panel 4a. However, the synthesizer 22 may be provided for all the transmission panels 2, and the output of the synthesizer 22 may be transmitted to all the transmission panels 2 and the reception circuits 8 of all the reception panels 4.

Similarly to the synthesizer 22, for a clock generator that generates the clock signal for controlling the operation timing of the power amplifier 24 and the reception circuit 8, a clock generator may be provided for the transmission panel 2a, and the output of the clock generator may be transmitted to the transmission panel 2a and the reception circuits 8a-1, 8a-2, 8a-3, and so on of the reception panel 4a, or a clock generator may be provided for all the transmission panels 2, and the output of the clock generator may be transmitted to all the transmission panels 2 and the reception circuits 8 of all the reception panels 4.

Figure 4B:
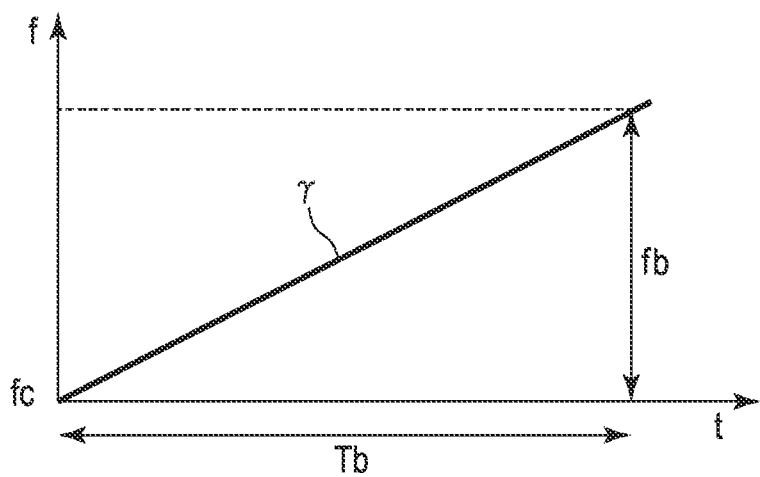

As a radar method, various methods can be adopted. Here, a frequency modulated continuous wave (FMCW) method is adopted. The synthesizer 22a generates an FMCW signal of which the frequency linearly increases with the lapse of time. The FMCW signal is also referred to as a chirp signal. The chirp signal is represented as illustrated in FIG. 4A, where an amplitude "A" is represented as a function of time t. The chirp signal is represented as illustrated in FIG. 4B, where a frequency f is represented as a function of the time t. As illustrated in FIG. 4S, the chirp signal is represented by a center frequency fc, a modulation bandwidth fb, and a signal time width Tb. The slope of the chirp signal is referred to as a frequency change rate (chirp rate) γ.

A transmission wave St(t) of the FMCW signal radiated from the transmission panel 2 is represented by Equation 1.

$$St(t)=\cos[2\pi(fc \times t+\gamma t^2/2)] \qquad \text{Equation 1}$$

The chirp rate γ is represented by Equation 2.

$$\gamma=fb/Tb \qquad \text{Equation 2}$$

At this time, the reflected wave from an object away by a distance R from the transmission panel 2 (or the reception panel 4) is observed with a delay of Δt=2R/c from a transmission timing where c is the speed of light. When the reflection intensity of the subject is "a", a reception signal Sr(t)) is represented by Equation 3.

$$Sr(t)=a\times\cos[2\pi fc(t-\Delta t)+\pi\gamma(t-\Delta t)^2]$$ Equation 3

Figure 5A:
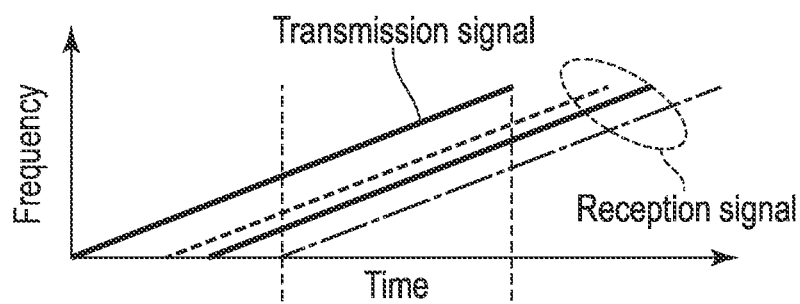
FIG. 5A, FIG. 5B, and FIG. 5C illustrate a detection principle according to the embodiment.
Figure 5B:
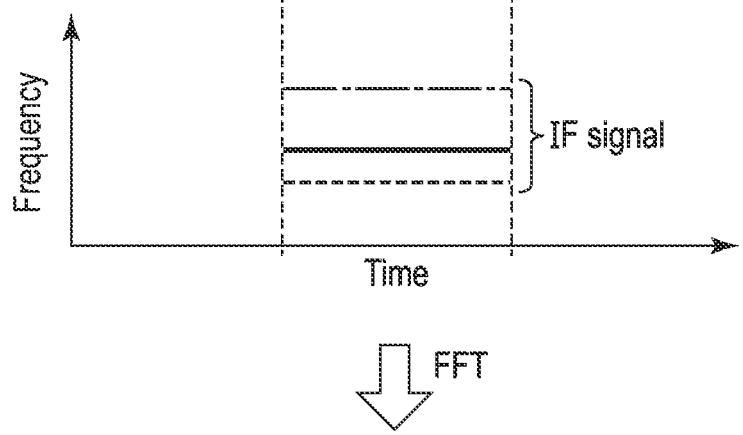
Figure 5C:
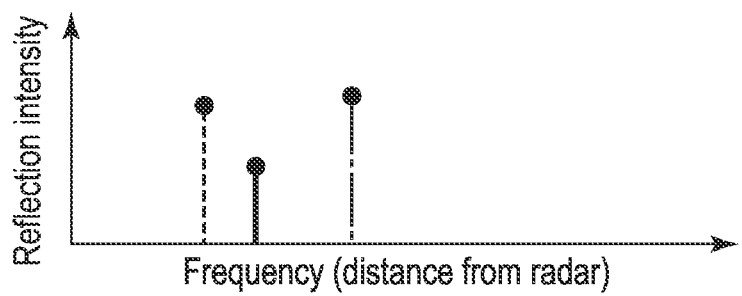

FIGS. 5A, 5B, and 5C illustrate a detection principle in a case where there are a plurality objects, for example, three objects. FIG. 5A illustrates a relationship between a transmission signal and time and a relationship between a reception signal and time. As illustrated in FIG. 5A, the frequency of the transmission signal changes linearly with time. The reception signal is delayed by Δt with an respect to the transmission signal. In a case where there are a plurality of objects, a reflected wave from the closest object is received earliest as indicated by a broken line, and a reflected wave from the farthest object is received latest as indicated by an alternate long and short dash line.

As illustrated in FIG. 2, the reception signal is multiplied by the transmission signal in the mixer 28 and input to the LPF 30. The output signal of the LPF 30 is referred to as an IF signal z(t) and is represented by Equation 4.

$$z(t)=a^*\cos(2\pi\Delta r\gamma t)$$ Equation 4

FIG. 5B illustrates a relationship between the frequency of the IF signal and time. Under an ideal environment without noise or the like, the frequency is constant for each reflected wave. As indicated by a broken line, the frequency of the reflected wave from the closest object is the lowest, and as indicated by an alternate long and short dash line, the frequency of the reflected wave from the farthest object is the highest.

A reflection intensity in a frequency domain can be calculated by performing FFT on the IF signal z(t) in a time domain shown in Equation 4 in the FFT circuit 34. Therefore, an amplitude at each point in the frequency domain that is the result of the FFT of the IF signal corresponds to a reflection intensity at each distance from the radar. The frequency and the distance from the radar have the relationship of Equation 5.

$$f_{if}=\Delta t\dot{\gamma}=2R\gamma/c$$ Equation 5

FIG. 5C illustrates a relationship between the reflection intensity obtained by performing FFT on the IF signal in the time domain and the frequency. In this manner, by obtaining the amplitude of the frequency domain signal of the IF signal, the reflection intensity for each distance from the transmission panel 2 (or the reception panel 4) can be obtained.

The above-described processing is performed for radiation points along a scanning direction.

Incidentally, as the radar method, a non-linear chirp radar, a frequency sweep type (Stepped-Frequency Continuous Wave (SFCW) radar, or a pulse radar may be used in addition to the FMCW radar.

Figure 6A:
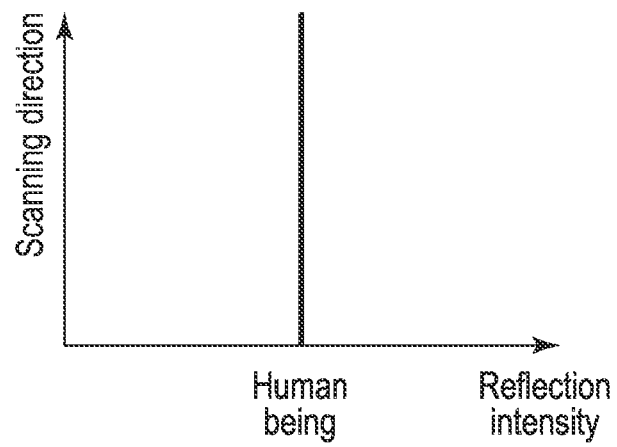
FIG. 6A, FIG. 6B, and FIG. 6C illustrate a distribution of the reflection intensity of the subject.
Figure 6B:
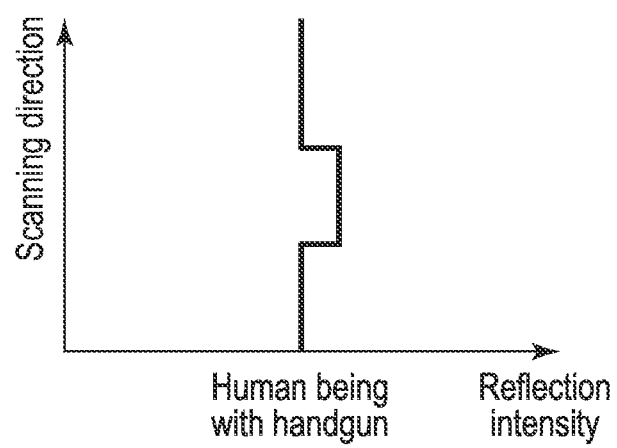
Figure 6C:
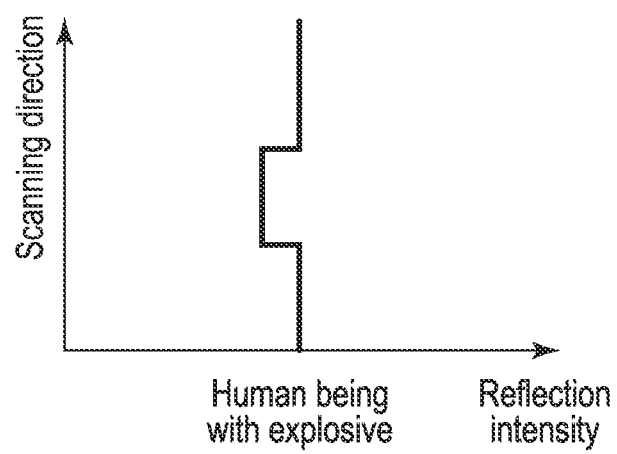

FIGS. 6A, 6B, and 6C illustrate the distribution of the reflection intensity when the subject is scanned with the electromagnetic wave along a certain line in a vertical direction. The reflection intensity varies depending on a substance that reflects the electromagnetic wave. FIG. 6A illustrates a reflection intensity distribution in a case where the subject (human being) carries nothing. Since the electromagnetic wave is reflected by the skin of the human being, the reflection intensity of the electromagnetic wave does not change regardless of the position of the radiation point, and the distribution of the reflection intensity is a flat distribution. FIG. 6B illustrates a reflection intensity distribution in a case where the human being carries a handgun (metal) substantially at the center. Since the metal has a higher reflection intensity than the skin, the reflection intensity of the electromagnetic wave at the radiation point corresponding to the position of the handgun is higher than the reflection intensity of the electromagnetic wave at other points. Since a horizontal axis indicates the reflection intensity (the right indicates a high reflection intensity), the reflection intensity of the electromagnetic wave has a distribution convex to the right. FIG. 6C illustrates the reflection intensity distribution of the electromagnetic wave in a case where the human being carries an explosive substantially at the center. Since the explosive absorbs the electromagnetic wave better than the skin, the reflection intensity of the radiation point corresponding to the position of the explosive is lower than the reflection intensities of other points, and the reflection intensity of the electromagnetic wave has a distribution convex to the left. The distribution can be specified by a difference between the reflection intensity values at least at two points. The display device 16 may display the reflection intensity distribution illustrated in FIG. 6A, 6B, or 6C, and the operator may visually observe the shape of the distribution to determine a risk level.

When acquiring the reflection intensities at least two points on a scanning line, the controller 14 can determine the risk level relating to a possibility that the human being carries the dangerous article based on a difference in the distribution shape of the reflection intensity of the electromagnetic wave. The controller 14 may obtain the risk level as a binary value (dangerous or safe) or may obtain a multi-valued risk level (for example, considerably dangerous, somewhat dangerous, somewhat safe, considerably safe, and the like) indicating the risk level. The external device connected to the radar device 1 via the communication circuit 18 may determine the risk level by using artificial intelligence. An example of the artificial intelligence is machine learning. In the machine learning, an arithmetic circuit representing a model (neural network or the like) for obtaining the risk level from the reflection intensity of the electromagnetic wave at each point is defined. The model includes nodes having a plurality of stages. A parameter indicating a coupling strength for transmitting information between nodes is defined. The reflection intensity of the electromagnetic wave at each point is input to an input stage, and the risk level is output from an output stage. In the case of supervised learning, the reflection intensity of the electromagnetic wave at each point is input to the arithmetic circuit, and the parameter is learned so that the risk level output from the arithmetic circuit approaches the risk level as teacher data given by the manager of the facility or a learning specialist.

FIG. 7 illustrates the principle of the array antenna of the transmission panel 2 and the reception panel 4. FIG. 7 illustrates an example in which a planar array antenna is used as the array antenna. Since a linear array antenna is a part of the planar array antenna, the description of FIG. 7 also applies to the linear array antenna.

A virtual lattice with a constant interval d (for example, a substantially half wavelength (≈λ/2)) is defined in the transmission panel 2, and a plurality of antennas 42 are arranged at intersections of the virtual lattice to form the array antenna. In a half-wavelength array antenna, the antennas 42 are arranged at all the intersections of the lattice. According to the embodiment, the antennas 42 are not arranged at all the intersections of the lattice. The actual antennas 42 are not arranged at most intersections (circles indicated by broken lines in FIG. 7) of the lattice. The plurality of antennas 42 are two-dimensionally arranged at intervals Dx1 along an X direction and at intervals Dy1 along a Y direction. Dx1 is N1 times d and Dy1 is M1 times d. N1 and M1 are positive integers of two or more. N1 and M1 may be equal to or different from each other. As an example, FIG. 7 illustrates an example in which Dx1=3d and Dy1=3d in the case of N1=M1=3. The array antenna of the transmission panel 2 is an array antenna which includes antennas arranged more sparsely than the arrangement in the half-wavelength array antenna and is sparser than the half-wavelength array antenna, thereby does not cause interference between adjacent antennas.

The substantially half wavelength is a value including a deviation of at most 25% of the half wavelength ($=\lambda/2$) of the electromagnetic wave transmitted by the antenna 42. The deviation may be required to be 10% or less.

A virtual lattice with the constant interval d is also defined in the reception panel 4, and a plurality of antennas 44 are arranged at intersections of the virtual lattice to form the array antenna. According to the embodiment, the antennas 44 are not arranged at all the intersections of the lattice. The actual antennas 44 are not arranged at most intersections (circles indicated by broken lines in FIG. 7) of the lattice. The plurality of antennas 44 are two-dimensionally arranged at intervals Dx2 along the direction and at intervals Dy2 along the Y direction. Dx2 is N2 times d and Dy2 is M2 times d. N2 and M2 are positive integers of two or more. N2 and M2 may be equal to or different from each other. As an example, FIG. 7 illustrates an example in which Dx2=4d and Dy2=4d in the case of N2=M2=4. The array antenna of the reception panel 4 is an array antenna which includes antennas arranged more sparsely than the arrangement in the half-wavelength array antenna and is sparser than the half-wavelength array antenna, and does not cause interference between adjacent antennas.

M1 and M2 are coprime to each other. For example, M1=3 and M2=4. N1 and N2 are coprime to each other. For example, N1=3 and N2=4.

When an interval between antennas of the first array antenna 2 is M1 or N1 times a half wavelength, an interval between antennas of the second array antenna 4 is M2 or N2 times a half wavelength, and M1 (or N1) and M2 (or N2) are coprime to each other, the resolution of the image generated by using two array antennas 2 and 4 is irrelevant to the antenna interval, and is determined by the aperture size of the array and the beam pattern of the antenna. Since the aperture size of the array can be freely set, when the aperture size is the same as the cross-sectional area of the subject, the array antenna can completely cover the subject. The beam pattern of the antenna is set such that a transmission antenna at a random position can transmit an electromagnetic wave to the subject, and a reception antenna at a random position can receive the electromagnetic wave reflected from the subject. For this reason, the resolution of the image obtained by transmission and reception of the electromagnetic wave by the transmission panel 2 and the reception panel 4 can be matched with the resolution of the image obtained by the transmission and reception of the electromagnetic wave by the half-wavelength array antenna. The number of the antennas of the transmission panel 2 is 25. The number of the antennas of the reception panel 4 is 16. In a case where both the transmission panel 2 and the reception panel 4 are half-wavelength array antennas, the number of the antennas arranged at all lattice intersections of each of the transmission panel 2 and the reception panel 4 is 169. According to the embodiment, the number of the antennas can be reduced. When the number of the antennas is small, a transmission/reception time is short, the data amount of the reception signal is small, and an arithmetic operation time is short.

A characteristic of an array antenna in which antennas are arranged at intervals wider than a substantially half wavelength will be described. Assuming that the number of the antennas is N, an antenna interval is D, the excitation phase difference between the antennas is $\beta$, and the direction of a measurement point in the subject is an angle of $\theta$ with respect to an array antenna surface, the propagation phase difference of the electromagnetic waves transmitted from two antennas is $kD \cos \theta$. k is a wave number.

A total phase shift $\psi$ is represented by Equation 6.

$$\psi = kD \cos \theta + \beta \qquad \text{Equation 6}$$

Considering a round trip of transmission and reception, the wave number k is represented by $4\pi/\lambda$. Therefore, a normalized radiation pattern is represented by Equation 7.

$$AF = (1/N)(\sin(N\psi/2)/\sin(\psi/2)) \qquad \text{Equation 7}$$

Equation 7 is a general representation of the radiation pattern of the array antenna. The maximum value of Equation 7 is obtained when the condition of Equation 8 is satisfied.

$$\psi = kD \cos \theta + \beta = \pm 2m\pi \qquad \text{Equation 8}$$

Here, m=0, 1, 2, and so on. In many cases, it is desirable that the radiation is maximized in a direction perpendicular to the axis of the array. In order to obtain a first maximum value in the direction of $\theta = \pi/2$, the condition of Equation 9 is required.

$$\psi = kD \cos \theta + \beta|_{\theta=\pi/2} = \beta = 0 \qquad \text{Equation 9}$$

For this reason, in order to maximize the maximum value of the array factor in the direction perpendicular to the axis of the array antenna, all the antennas need to have the same excitation phase. However, since $D = \lambda/2$ and $\beta = 0$, the total phase shift $\psi$ is represented by Equation 10.

$$\psi = kD \cos \theta + \beta = 2\pi \cos \theta|_{\theta=\pi/2} = \pm 2\pi \qquad \text{Equation 10}$$

When $\psi$ in Equation 10 is substituted into Equation 7, it can be seen that the maximum value of the array factor is obtained when $\theta = 0, \pi$. This means that the array factor is maximized at three points $\theta = 0, \pi/2, \pi$. The two additional maximum values are referred to as grating lobes. In addition, when $D = 2.5\lambda$ and $\beta = 0$, it can be seen that the maximum value of $\theta = 0$ shifts to the angular range of $0 < \theta < \pi/2$ and the maximum value of $\theta = \pi$ shifts to the angular range of $\pi/2 < \theta < \pi$, thereby generating two additional grating lobes. When the antenna interval D is increased to $5\pi$, ten grating lobes are generated on both sides of a main lobe.

Therefore, when the antenna interval $D = n\pi/2$, and n=1, 2, 3, and so on, the total phase shift $\psi$ is represented by Equations 11 and 12.

$$\psi = kD \cos \theta + \beta = 2\pi n \cos \theta \qquad \text{Equation 11}$$

$$2\pi n \cos \theta_m = 2m\pi \qquad \text{Equation 12}$$

When there is $\theta_m$ (m=0, 1, 2, and so on) that satisfies Equation 12, $\theta_m$ is a set of angles at which the array factor becomes the maximum value. That is, $\theta_m$ (m=0, 1, 2, and so on) is represented by Equation 13.

$$\theta_m = \cos^{-1}(m/n) \qquad \text{Equation 13}$$

Since the antenna interval Dx1 (of the transmission panel 2 in the X direction)=N1×d (N1=3), the antenna interval Dx2 (of the reception panel 4 in the X direction)=N2×d (N2=4), and N1 and N2 are coprime to each other, Equation 13 indicates that the array factors of the array antenna simultaneously become the maximum value at the same angle, that is, in the vertical direction (Z direction) of the array.

Since the antenna interval Dy1 (of the transmission panel 2 in the Y direction)=M1×d (M1=3), the antenna interval Dy2 (of the reception panel 4 in the Y direction)=M2×d (M2=4), and M1 and M2 are coprime to each other, Equation 13 indicates that the array factors of the array antenna simultaneously become the maximum value at the same angle, that is, in the vertical direction (Z direction) of the array.

Therefore, the positions of the grating lobes of the two array antennas 2 and 4 are different. In the image obtained by the transmission and reception of electromagnetic waves by an array antenna in which antennas are arranged at intervals wider than a substantially half wavelength, a phantom is generated at the position of a grating lobe. Therefore, the positions of the phantoms caused by transmission and reception by two array antennas 2 and 4 in which antenna intervals are coprime to each other are different, and thus the influence of the phantoms can be removed by performing image processing on two images caused by transmission and reception by the two array antennas 2 and 4.

Next, an example of a combination of at least one transmission panel and a plurality of reception panels included in the radar device 1 or an example of a combination of a plurality of transmission panels and at least one reception panel will be described with reference to FIGS. 8 to 12.

Figure 8:
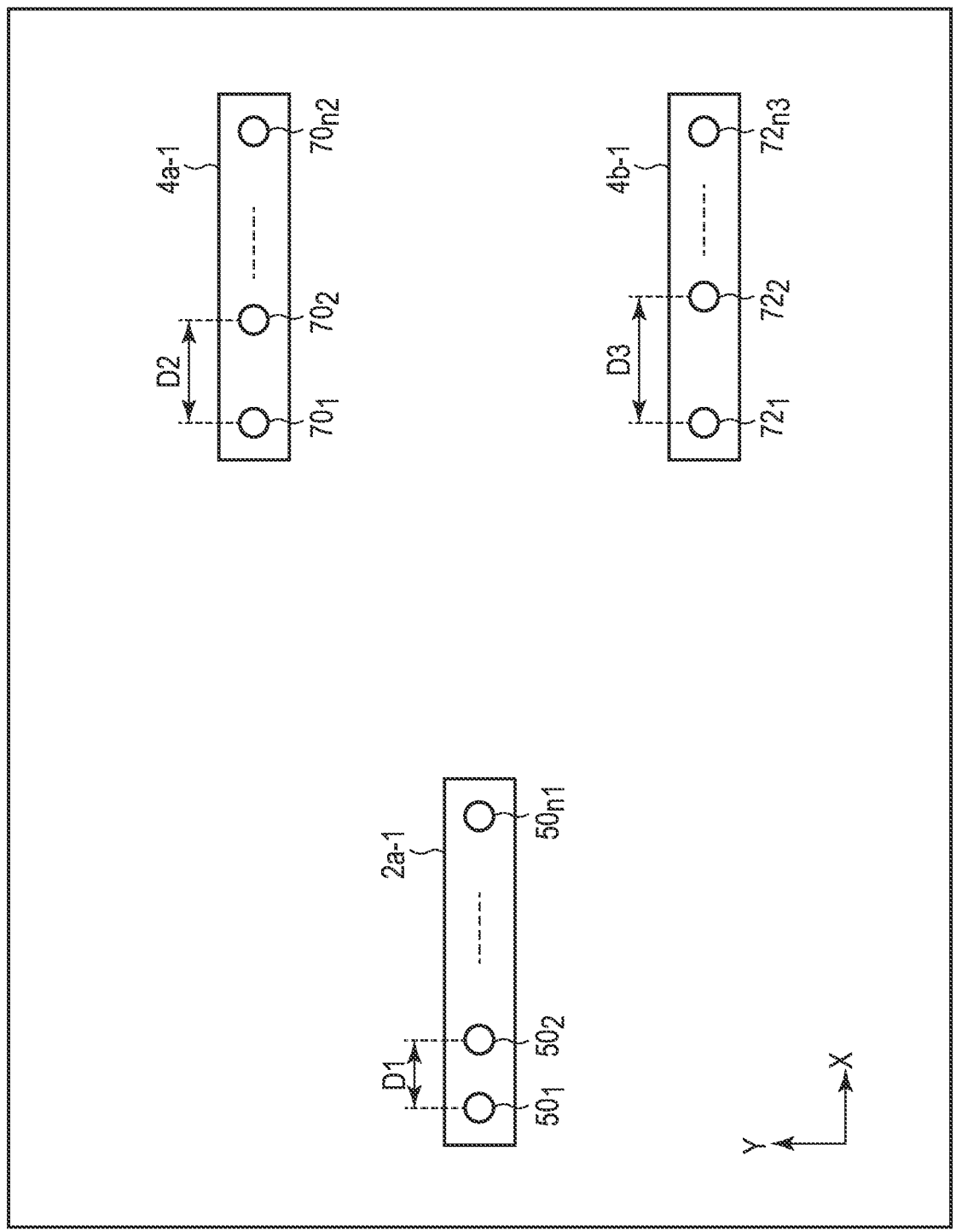
FIG. 8 illustrates a first example of a radar device includes at least one transmission panel and a plurality of reception panels according to the embodiment.

FIG. 8 illustrates a first example in which the radar device 1 includes at least one (for example, one) transmission panel 2a-1 and a plurality of (for example, two) reception panels 4a-1 and 4b-1. In the first example, each of the transmission panel 2a-1 and reception panels 4a-1 and 4b-1 includes a linear array antenna.

The transmission panel 2a-1 includes a plurality of (n1) antennas $50_1$ to $50_{n1}$ which are one-dimensionally arranged at an interval D1 along the X direction. The number n1 is a positive integer of two or more. The interval D1 is d1 times the substantially half wavelength. The number d1 is a positive integer of two or more.

The reception panel 4a-1 includes a plurality of (n2) antennas $70_1$ to $70_{n2}$ which are one-dimensionally arranged at an interval D2 along the X direction. The number n2 is a positive integer of two or more, and may be equal to or different from n1. The interval D2 is d2 times the substantially half wavelength. The number d2 is a positive integer of two or more. The numbers d2 and d1 are coprime to each other.

The reception panel 4b-1 includes a plurality of (n3) antennas $72_1$ to $72_{n3}$ which are one-dimensionally arranged at an interval D3 along the X direction. The number n3 is a positive integer of two or more, and may be equal to or different from n1 or n2. The interval D3 is d3 times the substantially half wavelength. The number d3 is a positive integer of two or more, and may be equal to or different from d2. The numbers d3 and d1 are coprime to each other. The numbers d3 and d2 may be coprime to each other or may not be coprime to each other.

The radar device 1 may include three or more reception panels 4. The configuration of the third or subsequent reception panels 4 is similar to that of the reception panels 4a-1 and 4b-1. The arrangement direction of the linear array antennas of the transmission panel 2 and the reception panel 4 is not limited to the X direction, and may be any direction. Since the transmission antenna and reception antenna are compatible, the radar device 1 may include a plurality of transmission panels 2 and at least one reception panel 4 contrary to the example of FIG. 8.

Figure 9:
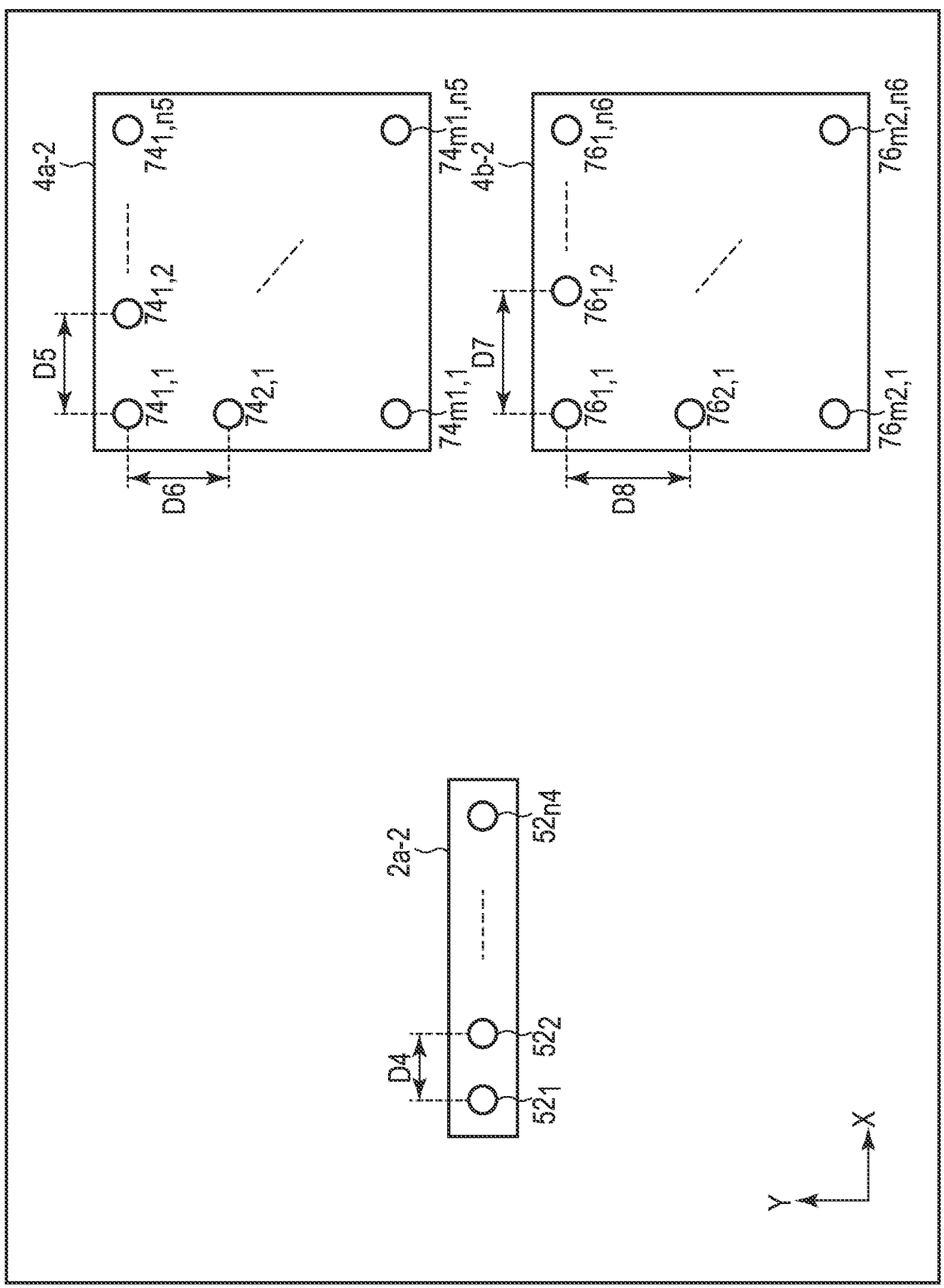
FIG. 9 illustrates a second example of a radar device includes at least one transmission panel and a plurality of reception panels according to the embodiment.

FIG. 9 illustrates a second example in which the radar device 1 includes at least one (for example, one) transmission panel 2a-2 and a plurality of (for example, two) reception panels 4a-2 and 4b-2. In the second example, the transmission panel 2a-2 includes a linear array antenna, and each of the reception panels 4a-2 and 4b-2 includes a planar array antenna.

The transmission panel 2a-2 includes a plurality of (n4) antennas $52_1$ to $52_{n4}$ which are one-dimensionally arranged at an interval D4 along the X direction. The number n4 is a positive integer of two or more. The interval D4 is d4 times the substantially half wavelength. The number d4 is a positive integer of two or more.

The reception panel 4a-2 includes a plurality of (m1×n5) antennas $74_{1,1}$ to $74_{m1,n5}$ which are two-dimensionally arranged at an interval D5 along the X direction and at an interval D6 along the Y direction. The number n5 is a positive integer of two or more, and may be equal to or different from n4. The interval D5 is d5 times the substantially half wavelength. The number d5 is a positive integer of two or more. The numbers d5 and d4 are coprime to each other. The number m1 is a positive integer of two or more, and may be equal to or different from n5. The interval D6 is d6 times the substantially half wavelength. The number d6 is a positive integer of two or more, and may be equal to or different from d5. The numbers d5 and d6 may be coprime to each other or may not be coprime to each other.

The reception panel 4b-2 includes a plurality of (m2×n6) antennas $76_{1,1}$ to $76_{m2,\,n6}$ which are two-dimensionally arranged at an interval D7 along the X direction and at an interval D8 along the Y direction. The number n6 is a positive integer of two or more, and may be equal to or different from n5. The interval D7 is d7 times the substantially half wavelength. The number d7 is a positive integer of two or more, and may be equal to or different from d5. The numbers d7 and d4 are coprime to each other. The numbers d7 and d5 may be coprime to each other or may not be coprime to each other. The number m2 is a positive integer of two or more, and may be equal to or different from m1. The interval D8 is d8 times the substantially half wavelength. The number d8 is a positive integer of two or more, and may be equal to or different from d6. The numbers d7 and d8 may be coprime to each other or may not be coprime to each other. The numbers d8 and d6 may be coprime to each other or may not be coprime to each other.

The radar device 1 may include three or more reception panels 4. The configuration of the third or subsequent reception panels 4 is similar to that of the reception panels 4a-2 and 4b-2. The arrangement direction of the linear array antenna of the transmission panel 2 is not limited to the X direction, and may be any direction. The arrangement direction of the planar array antenna of the reception panel 4 includes the arrangement direction of the linear array antenna and the direction intersecting the arrangement direction of the linear array antenna. The intersection angle between two arrangement directions of the planar array antenna of the reception panel 4 is not limited to 90 degrees. Since the transmission antenna and reception antenna are compatible, the radar device 1 may include a plurality of transmission panels 2 including planar array antennas and at least one reception panel 4 including a linear array antenna contrary to the example of FIG. 9.

A combination of FIGS. 8 and 9 is also possible. That is, the radar device 1 may include at least one transmission panel 2 which is a linear array antenna and a plurality of reception panels 4 each of which is a linear array antenna or planar array antenna. Alternatively, the radar device 1 may include a plurality of transmission panels 2 each of which is a linear array antenna or planar array antenna and at least one reception panel 4 which is a linear array antenna.

Figure 10:
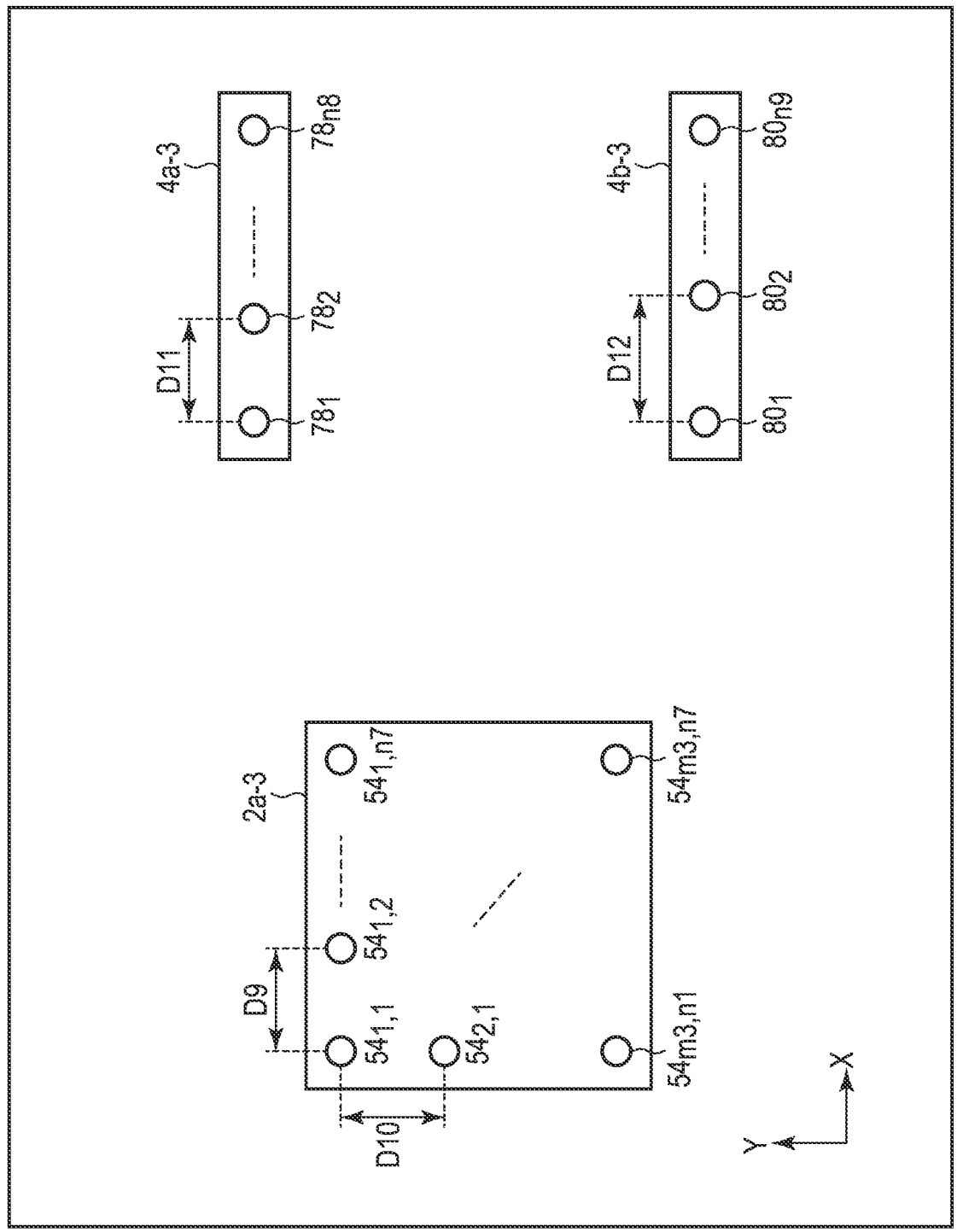
FIG. 10 illustrates a third example of a radar device includes at least one transmission panel and a plurality of reception panels according to the embodiment.

FIG. 10 illustrates a third example in which the radar device 1 includes at least one (for example, one) transmission panel 2a-3 and a plurality of (for example, two) reception panels 4a-3 and 4b-3. In the third example, the transmission panel 2a-3 includes a planar array antenna and each of the reception panels 4a-3 and 4b-3 includes a linear array antenna.

The transmission panel 2a-3 includes a plurality of (m3× n7) antennas $54_{1,1}$ to $54_{m3,n7}$ which are two-dimensionally arranged at an interval D9 along the X direction and at an interval D10 along the Y direction. The number n7 is a positive integer of two or more. The interval D9 is d9 times the substantially half wavelength. The number d9 is a positive integer of two or more. The number m3 is a positive integer of two or more, and may be equal to or different from n7. The interval D10 is d10 times the substantially half wavelength. The number d10 is a positive integer of two or more, and may be equal to or different from d9. The numbers d10 and d9 may be coprime to each other or may not be coprime to each other.

The reception panel 4a-3 includes a plurality of (n8) antennas $78_1$ to $78_{n8}$ which are one-dimensionally arranged at an interval D11 along the X direction. The number n8 is a positive integer of two or more, and may be equal to or different from n7. The interval D11 is d11 times the substantially half wavelength. The number d11 is a positive integer of two or more. The numbers d11 and d9 are coprime to each other. The numbers d11 and d10 may be coprime to each other or may not be coprime to each other.

The reception panel 4b-3 includes a plurality of (n9) antennas $80_1$ to $80_{n9}$ which are one-dimensionally arranged at an interval D12 along the X direction. The number n9 is a positive integer of two or more, and may be equal to or different from n8. The interval D12 is d12 times the substantially half wavelength. The number d12 is a positive integer of two or more, and may be equal to or different from d11. The numbers d12 and d9 are coprime to each other. The numbers d12 and d11 may be coprime to each other or may not be coprime to each other. The numbers d12 and d9 or the numbers d12 and d10 may be coprime to each other or may not be coprime to each other.

The radar device 1 may include three or more reception panels 4. The configuration of the third or subsequent reception panels 4 is similar to that of the reception panels 4a-3 and 4b-3. The arrangement direction of the linear array antenna of the reception panel 4 is not limited to the X direction, and may be any direction. The arrangement direction of the planar array antenna of the transmission panel 2 includes the arrangement direction of the linear array antenna and the direction intersecting the arrangement direction of the linear array antenna. The intersection angle between two arrangement directions of the planar array antenna is not limited to 90 degrees. Since the transmission antenna and reception antenna are compatible with each other, the radar device 1 may include a plurality of transmission panels 2 each of which is s linear array antenna and at least one reception panel 4 which is a planar array antenna contrary to the example of FIG. 10.

At least one of the reception panels 4a-3 and 4b-3 of FIG. 10 may include a planar array antenna.

Figure 11:
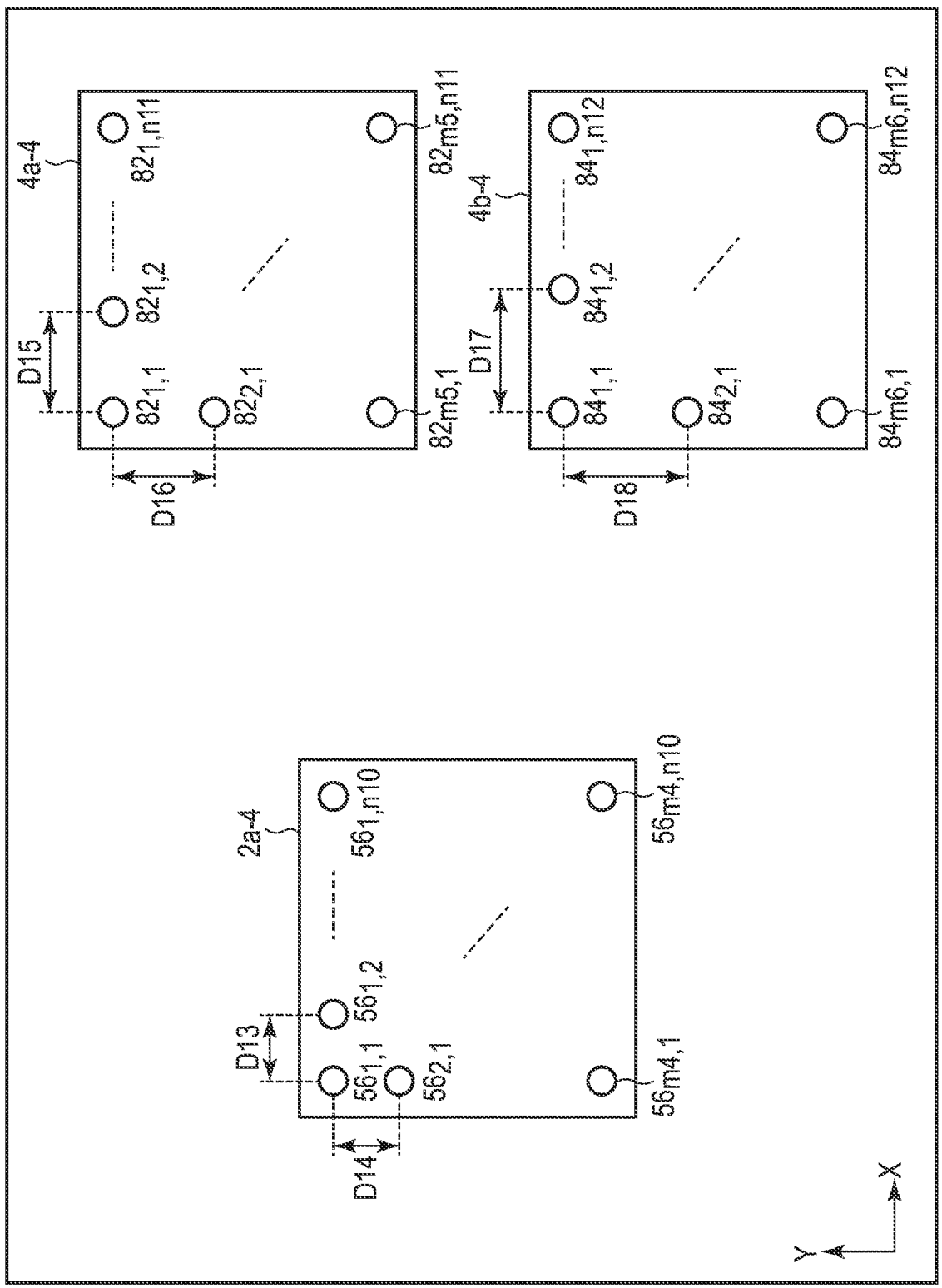
FIG. 11 illustrates a fourth example of a radar device includes at least one transmission panel and a plurality of reception panels according to the embodiment.

FIG. 11 illustrates a fourth example in which the radar device 1 includes at least one (for example, one) transmission panel 2a-4 and a plurality of (for example, two) reception panels 4a-4 and 4b-4. In the fourth example, each of the transmission panel 2a-4 and reception panels 4a-4 and 4b-4 includes a planar array antenna.

The transmission panel 2a-4 includes a plurality of (m4× n10) antennas $56_{1,1}$ to $56_{m4,n10}$ which are two-dimensionally arranged at an interval D13 along the X direction and at an interval D14 alone the Y direction. The number n10 is a positive integer of two or more. The interval D13 is d13 times the substantially half wavelength. The number d13 is a positive integer of two or more. The number m4 is a positive integer of two or more, and may be equal to or different from n10. The interval D14 is d14 times the substantially half wavelength. The number d14 is a positive integer of two or more, and may be equal to or different from d13. The numbers d14 and d13 may be coprime to each other or may not be coprime to each other.

The reception panel 4a-4 includes a plurality (m5×n11) antennas $82_{1,1}$ to $82_{m5,n11}$ which are two-dimensionally arranged at an interval D15 along the X direction and at an interval D16 along the Y direction. The number n11 is a positive integer of two or more, and may be equal to or different from n10. The interval D15 is d15 time the substantially half wavelength. The number d15 is a positive integer of two or more. The numbers d15 and d13 are coprime to each other. The number m5 is a positive integer of two or more, and may be equal to or different from n11. The interval D16 is d16 times the substantially half wavelength. The number d16 is a positive integer of two or more, and may be equal to or different from d15. The numbers d16 and d14 are coprime to each other. The numbers d16 and d15 may be coprime to each other or may not be coprime to each other. The numbers d15 and d14 may be coprime to each other or may not be coprime to each other. The numbers d16 and d13 may be coprime to each other or may not be coprime to each other.

The reception panel 4b-4 includes a plurality of (m6×n12) antennas $84_{1,1}$ to $84_{m6,n12}$ which are two-dimensionally arranged at an interval D17 along the X direction and at an interval D18 along the Y direction. The number n12 is a positive integer of two or more, and may be equal to or different from n11. The interval D17 is d17 times the substantially half wavelength. The number d17 is a positive integer of two or more, and may be equal to or different from d15. The numbers d17 and d13 are coprime to each other. The number m6 is a positive integer of two or more, and may be equal to or different from n12. The interval D18 is d18 times the substantially half wavelength. The number d18 is a positive integer of two or more, and may be equal to or different from d16. The numbers d18 and d14 are coprime to each other. The numbers d18 and d16 may be coprime to each other or may not be coprime to each other. The numbers d17 and d14 may be coprime to each other or may not be coprime to each other. The numbers d18 and d13 may be coprime to each other or may not be coprime to each other.

The radar device 1 may include three or more reception panels 4. The configuration of the third or subsequent reception panels 4 is similar to that of the reception panels 4a-4 and 4b-4. The arrangement directions of the planar array antennas of the transmission panel 2 and the reception panel 4 are not limited to the X direction and the Y direction, and may be any two directions. The intersection angle between two arrangement directions of the planar array antenna is not limited to 90 degrees. Since the transmission antenna and reception antenna are compatible, the radar device 1 may include a plurality of transmission panels 2 each of which includes a planar array antenna and at least one reception panel 4 including a planar array antenna contrary to the example of FIG. 11.

At least one of the plurality of reception panels 4 in FIG. 11 may include a linear array antenna.

Figure 12:
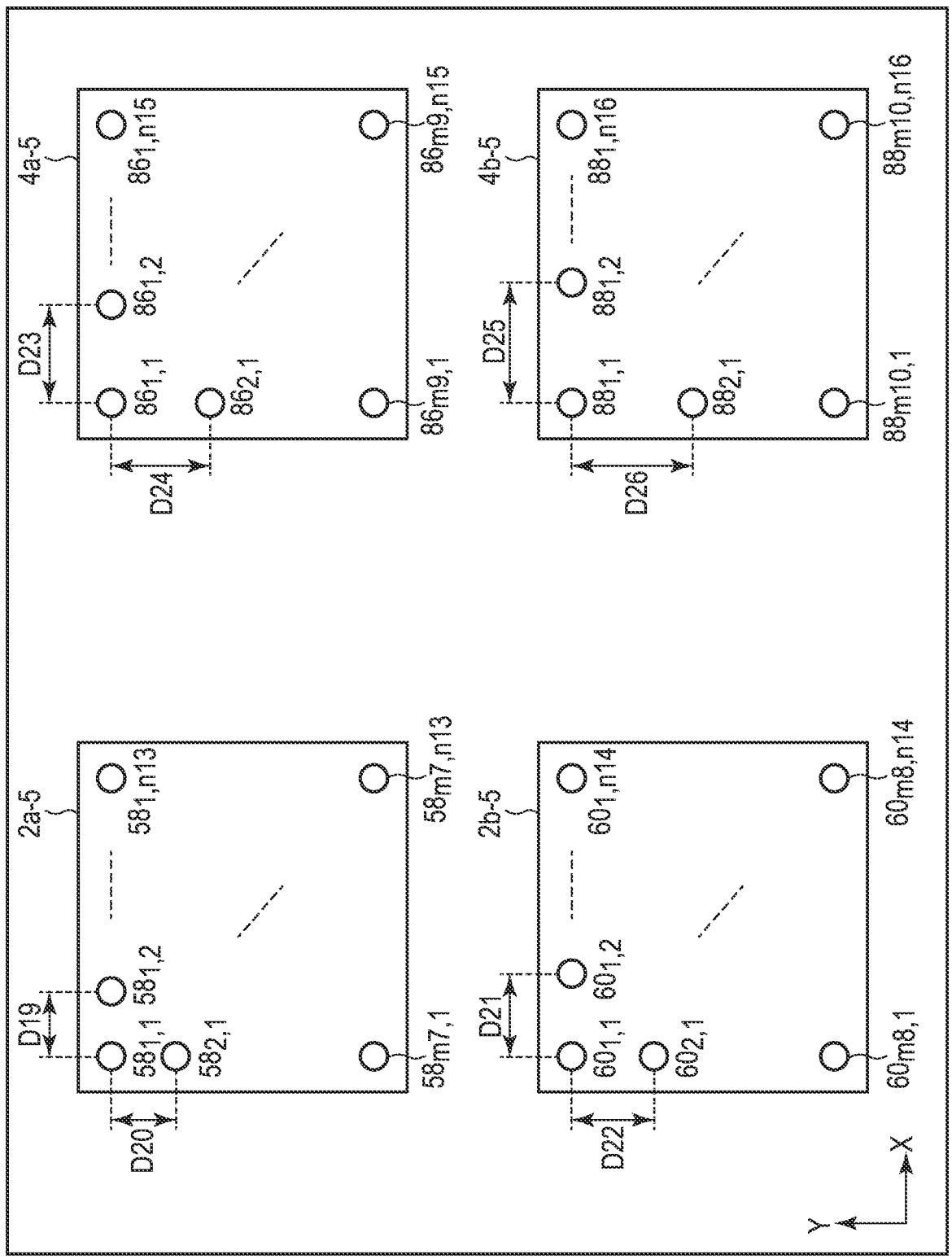
FIG. 12 illustrates a fifth example of a radar device includes at least one transmission panel and a plurality of reception panels according to the embodiment.

FIG. 12 illustrates a fifth example in which the radar device 1 includes a plurality of (for example, two) transmission panels 2a-5 and 2b-5 and a plurality of (for example, two) reception panels 4a-5 and 4b-5. In the fifth example, each of the transmission panels 2a-4 and 2b-5 and reception panels 4a-5 and 4b-5 includes a planar array antenna.

The transmission panel 2a-5 includes a plurality of (m7× n13) antennas $58_{1,1}$ to $58_{m7,n13}$ which are two-dimensionally arranged at an interval D19 along the X direction and at an interval D20 along the Y direction. The number n13 is a positive integer of two or more. The interval D19 is d19 times the substantially half wavelength. The number d19 is a positive integer of two or more. The number m7 is a positive integer of two or more, and may be equal to or different from n13. The interval D20 is d20 times the substantially half wavelength. The number d20 is a positive integer of two or more, and may be equal to or different from d19. The numbers d19 and d20 may be coprime to each other or may not be coprime to each other.

The transmission panel 2b-5 includes a plurality of (m8× n14) antennas $60_{1,1}$ to $60_{m8,n14}$ which are two-dimensionally arranged at an interval D21 along the X direction and at an interval D22 along the Y direction. The number n14 is a positive integer of two or more, and may be equal to or different from n13. The interval D21 is d21 times the substantially half wavelength. The number d21 is a positive integer of two or more, and may be equal to or different from d19. The numbers d21 and d19 are coprime to each other. The number m8 is a positive integer of two or more, and may be equal to or different from n14. The interval D22 is d22 times the substantially half wavelength. The number d22 is a positive integer of two or more, and may be equal to or different from d21. The number d22 and d20 are coprime to each other. The numbers d19 and d20 may be coprime to each other or may not be coprime to each other. The numbers d21 and d22 may be coprime to each other or may not be coprime to each other.

The reception panel 4a-5 includes a plurality of (m9×n15) antennas $86_{1,1}$ to $86_{m9,n15}$ which are two-dimensionally arranged at an interval D23 along the X direction and at an interval D24 along the Y direction. The number n15 is a positive integer of two or more, and may be equal to or different from n13 and n14. The interval D23 is d23 times the substantially half wavelength. The number d13 is a positive integer of two or more. The numbers d23 and d19 are coprime to each other. The numbers d23 and d21 are coprime to each other. The number m9 is a positive integer of two or more, and may be equal to or different from n15. The interval 924 is d24 times the substantially half wavelength. The number d24 is a positive integer of two or more, and may be equal to or different from d23. The number d24 and d20 are coprime to each other. The numbers d24 and d22 are coprime to each other. The numbers d23 and d20 or the numbers d23 and d22 may be coprime to each other or may not be coprime to each other. The numbers d24 and d19 or the numbers d24 and d21 may be coprime to each other or may not be coprime to each other.

The reception panel 4b-5 includes a plurality of (m10× n16) antennas $88_{1,1}$ to $88_{m10,n16}$ which are two-dimensionally arranged at an interval D25 along the X direction and at an interval D26 along the Y direction. The number n16 is a positive integer of two or more, and may be equal to or different from n14. The interval D25 is d25 times the substantially half wavelength. The number d25 is a positive integer of two or more, and may be equal to or different from d23. The numbers d25 and d19 may be coprime to each other or may not be coprime to each other. The numbers d25 and d21 are coprime to each other. The numbers d25 and d23 may be coprime to each other or may not be coprime to each other. The number m10 is a positive integer of two or more, and may be equal to or different from n16. The interval D26 is d26 times the substantially half wavelength. The number d26 is a positive integer of two or more, and may be equal to or different from d24. The numbers d26 and d20 may be coprime to each other or may not be coprime to each other. The numbers d26 and d22 are coprime to each other. The numbers d26 and d24 may be coprime to each other or may not be coprime to each other.

The radar device 1 may include three or more transmission panels 2. The configuration of the third or subsequent transmission panels 2 is similar to that of the transmission panels 2a-5 and 2b-5. The radar device 1 may include three or more reception panels 4. The configuration of the third or subsequent reception panels 4 is similar to that of the reception panels 4a-5 and 4b-5. The arrangement directions of the planar array antennas of the transmission panel and the reception panel 4 are not limited to the X direction and the Y direction, and may be any two directions. The intersection angle between two arrangement directions of the planar array antenna is not limited to 90 degrees.

At least one of the transmission panels 2 in FIG. 12 may include a linear array antenna. At least one of the reception panels 4 in FIG. 12 may include a linear array antenna.

Figure 21:
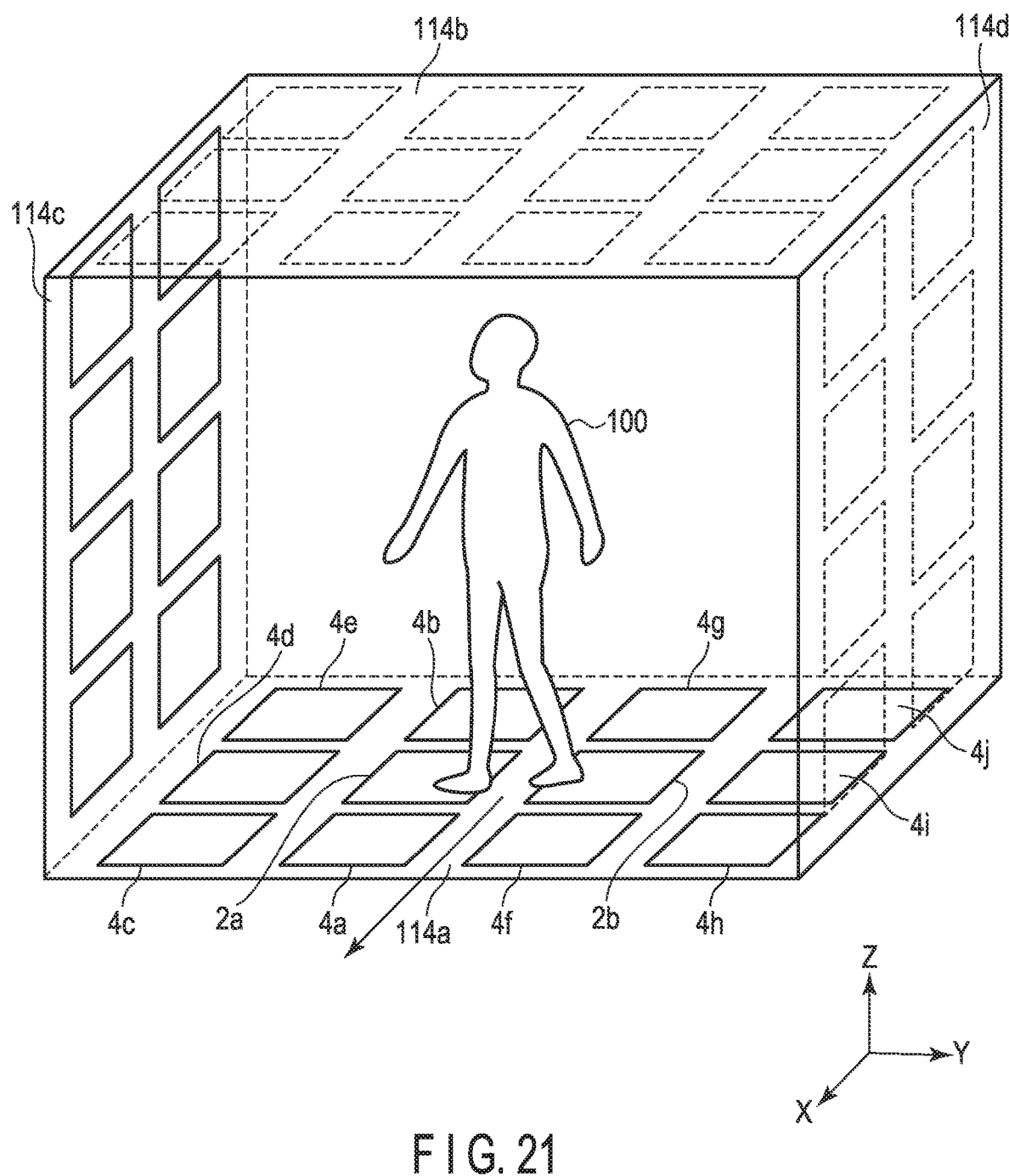
FIG. 21 illustrates a ninth example of a radar device includes at least one transmission panel and a plurality of reception panels according to the embodiment.

Next, examples of the arrangement of the transmission panel 2 and the reception panel 4 with respect to the subject 100 will be described with reference to FIGS. 13, 14, 15, 16, 17A, 17B, 18A, 18B, 19, 20, and 21. FIGS. 13 to 18B illustrate plan views. FIGS. 19 to 21 illustrate perspective views. In FIGS. 13 to 16, the radar device 1 includes at least one (for example, one) transmission panel 2a and a plurality of (for example, three) reception panels 4a, 4b, and 4c. The transmission panel 2 and the reception panel 4 may include any array antennas illustrated in FIGS. 8 to 12.

FIG. 13 illustrates a first example of arrangement of the transmission panel 2a and three reception panels 4a, 4b, and 4c. In the first example, the reception panel 4a, reception panel 4b, transmission panel 2a, and reception panel 4c are arranged on a substantially straight line in this order along the X direction. The transmission panel 2a radiates electromagnetic waves to the entire subject 100. Electromagnetic waves are reflected on the surface of the subject 100 or the dangerous article carried by the subject 100 in various directions. The direction of the reflected wave that can be received by one of the reception panels 4a, 4b, and 4c is limited. The subject 100 is divided into three regions 100a, 100b, and 100c by two division lines. The division line is not limited to the straight line, and may be a curve. The reception panel 4a is arranged at a position to receive electromagnetic waves reflected by the surface of the first region 100a or an object therein. The reception panel 4b is arranged at a position to receive electromagnetic waves reflected by the surface of the second region 100b or an object therein. The reception panel 4c is arranged at a position to receive electromagnetic waves reflected by the surface of the third region 100c or an object therein.

The image generation circuit 10 generates a first image indicating the object inside the first region 100a based on the reception signal of the reception panel 4a. The image generation circuit 10 generates a second image indicating the object inside the second region 100b based on the reception signal of the reception panel 4b. The image generation circuit 10 generates a third image indicating the object inside the third region 100c based on the reception signal of the reception panel 4c. When compositing the first image, second image, and third image, the image processing circuit 12 can generate an image indicating the object inside the entire subject 100.

Since the transmission antenna and reception antenna are compatible, the radar device 1 may include a plurality of transmission panels 2 and at least one reception panel 4 contrary to the example of FIG. 13.

FIG. 14 illustrates a second example of the arrangement of the transmission panel 2a and three reception panels 4a, 4b, and 4c. Also in the second example, the reception panel 4a, reception panel 4b, transmission panel 2a, and reception panel 4c are arranged on a substantially straight line in this order along the X direction. The transmission panel 2a radiates electromagnetic waves to the entire subject 100. The subject 100 is divided into the three regions 102a, 102b, and 102c. In the second example, the three regions 102a, 102b, and 102c partially overlap each other. The division line is not limited to the straight line, and may be a curve. The first region 102a and the second region 102b include a partially overlapping region 104. The second region 102b and the third region 102c include a partially overlapping region 106. The reception panel 4a is arranged at a position to receive electromagnetic waves reflected by the surface of the first region 102a or an object therein. The reception panel 4b is arranged at a position to receive electromagnetic waves reflected by the surface of the second region 102b or an object therein. The reception panel 4c is arranged at a position to receive electromagnetic waves reflected by the surface of the third region 102c or an object therein.

When compositing the first image, second image, and third image in consideration of the overlapping region, the image processing circuit 12 can generate an image indicating the object inside the entire subject 100.

Since the transmission antenna and reception antenna are compatible, the radar device 1 may include a plurality of transmission panels 2 and at least one reception panel 4 contrary to the example of FIG. 14.

Figure 15:
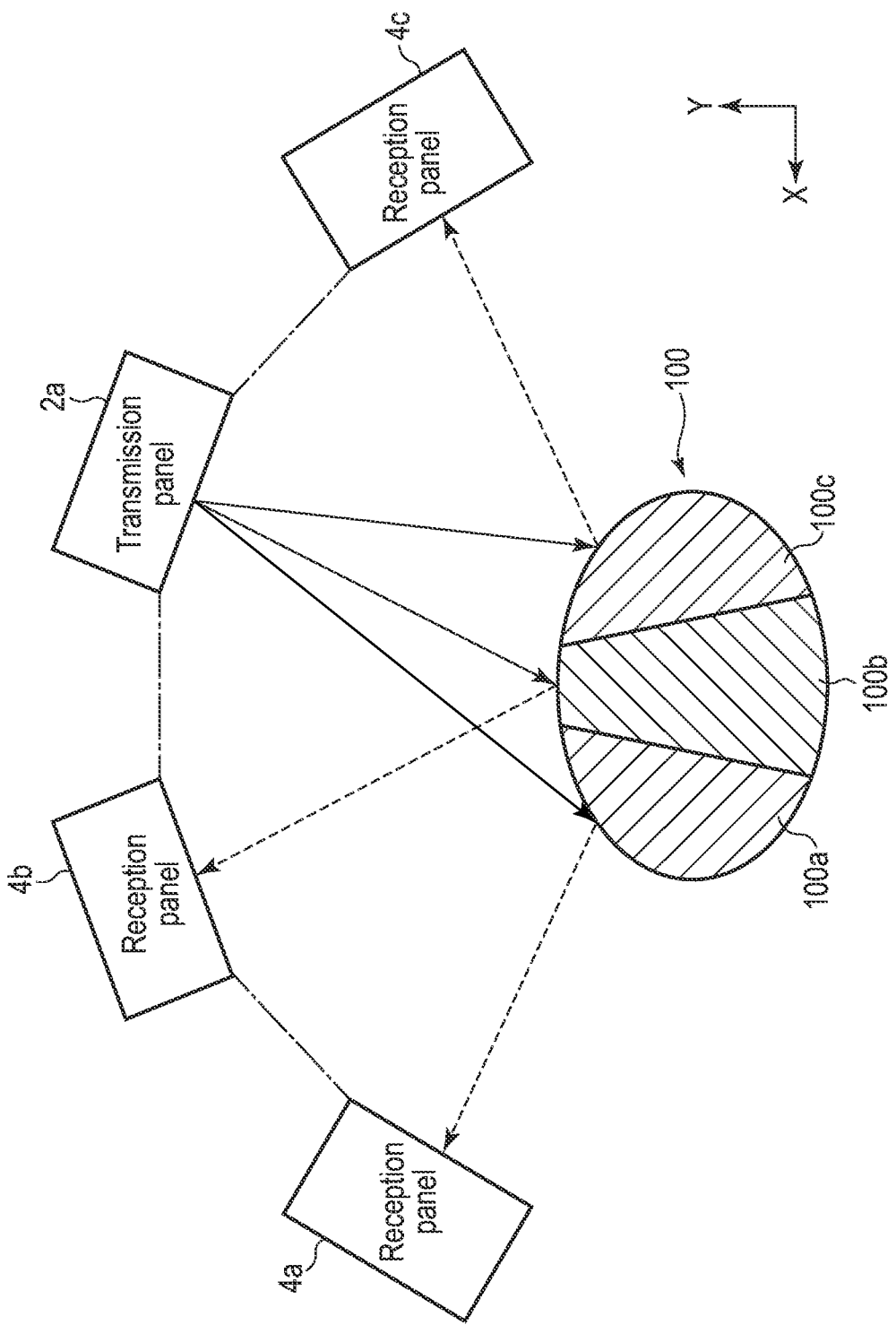
FIG. 15 illustrates a third example of an arrangement of at least one transmission panel and a plurality of reception panels with respect to a subject according to the embodiment.

FIG. 15 illustrates a third example of the arrangement of the transmission panel 2a and three reception panels 4a, 4b, and 4c. In the third example, the reception panel 4a, reception panel 4b, transmission panel 2a, and reception panel 4c are arranged to draw an arc on a surface such as a surface of a cylinder to surround the periphery of the subject 100. As in the first example, the subject 100 is divided into the three regions 100a, 100b, and 100c without overlapping. The reception panel 4a is arranged at a position to receive electromagnetic waves reflected by the surface of the first region 100a or an object therein. The reception panel 4b is arranged at a position to receive electromagnetic waves reflected by the surface of the second region 100b or an object therein. The reception panel 4c is arranged at a position to receive electromagnetic waves reflected by the surface of the third region 100c or an object therein. In the example of FIG. 15, the reception panels 4a, 4b, and 4c can be arranged closer to the subject 100 than in the examples of FIGS. 13 and 14.

Since the transmission antenna and the reception antenna are compatible, the radar device 1 may include a plurality of transmission panels 2 and at least one reception panel 4 contrary to the example of FIG. 15.

FIG. 16 illustrates a fourth example of the arrangement of the transmission panel 2a and three reception panels 4a, 4b, and 4c. In the fourth example, the reception panel 4a, reception panel 4b, transmission panel 2a, and reception panel 4c are arranged to draw an arc on a surface such as a surface of a cylinder to surround the periphery of the subject 100. As in the second example, the subject 100 is divided into the three regions 102a, 102b, and 102c which partially overlap each other. The reception panel 4a is arranged at a position to receive electromagnetic waves reflected by the surface of the first region 102a or an object therein. The reception panel 4b is arranged at a position to receive electromagnetic waves reflected by the surface of the second region 102b or an object therein. The reception panel 4c is arranged at a position to receive electromagnetic waves reflected by the surface of the third region 102c or an object therein. In the example of FIG. 16, the reception panels 4a, 4b, and 4c can be arranged closer to the subject 100 than in the examples of FIGS. 13 and 14.

Since the transmission antenna and reception antenna are compatible, the radar device 1 may include a plurality of transmission panels 2 and at least one reception panel 4 contrary to the example of FIG. 16.

Figure 17A:
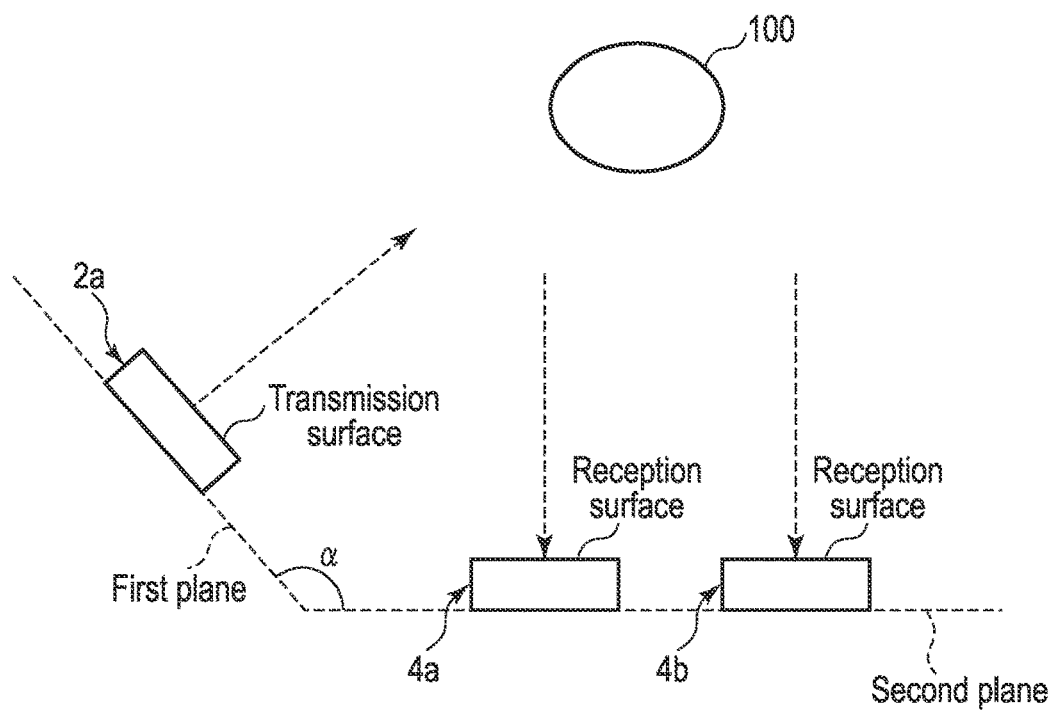
FIG. 17A and FIG. 17B illustrate a fifth example of an arrangement of at least one transmission panel and a plurality of reception panels with respect to a subject according to the embodiment.
Figure 17B:
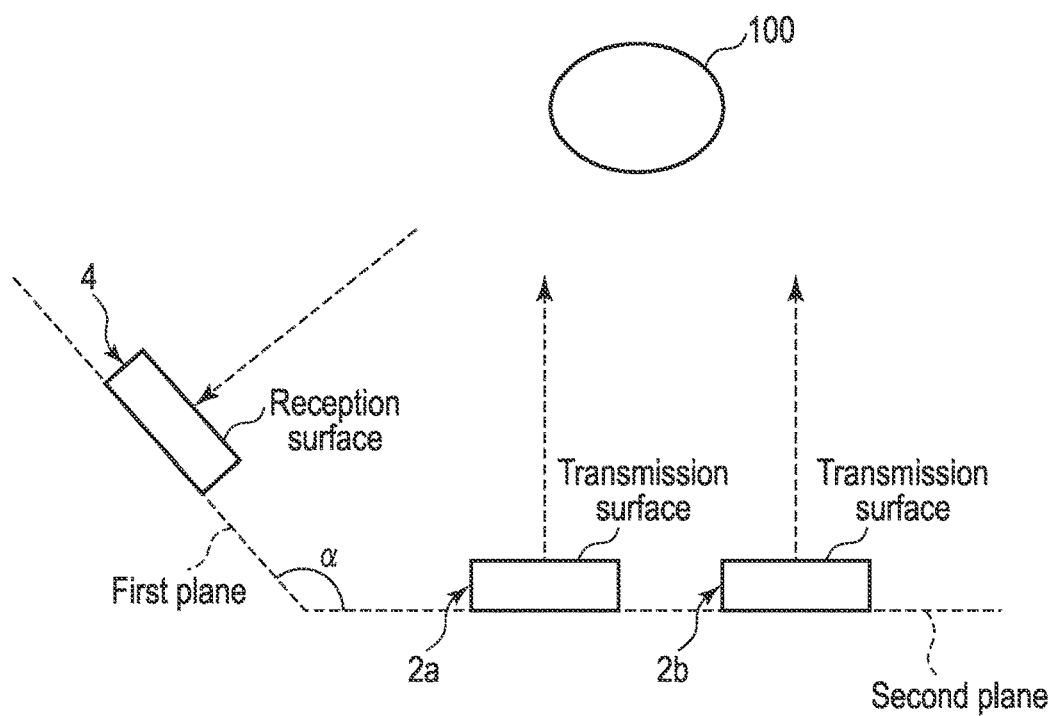

FIGS. 17A and 17B illustrate a fifth example of the arrangement of the transmission panel and the reception panel according to the embodiment. FIG. 17A illustrates an example in which the transmission panel 2a and two reception panels 4a and 4b are used. FIG. 17B illustrates an example in which the two transmission panels 2a and 2b and reception panel 4a are used.

In FIG. 17A, the transmission panel 2a is arranged on a first plane, and the reception panels 4a and 4b are arranged on a second plane. When an angle α formed by the first plane and second plane is larger than 0 degrees and smaller than 180 degrees, the electromagnetic waves which are radiated from the transmission surface of the transmission panel 2a and are reflected by any portion of the subject 100 are incident on the reception surface of the reception panel 4a or reception panel 4b. Accordingly, it is possible to inspect any portion of the subject 100. The transmission surface of the transmission panel 2a and the reception surfaces of the reception panels 4a and 4b are positioned between the first plane and second plane. The subject 100 may be a moving subject.

In FIG. 17B, the reception panel 4a is arranged on the first plane, and the transmission panels 2a and 2b are arranged on the second plane. When the angle α formed by the first plane and the second plane is larger than 0 degrees and smaller than 180 degrees, the electromagnetic waves which are radiated from the transmission surface of the transmission panel 2a or the transmission panel 2b and are reflected by any portion of the subject 100 are incident on the reception surface of the reception panel 4. Accordingly, it is possible to inspect any portion of the subject 100. The transmission surfaces of the transmission panels 2a and 2b and the reception surface of the reception panel 4 are positioned between the first plane and second plane.

Figure 18A:
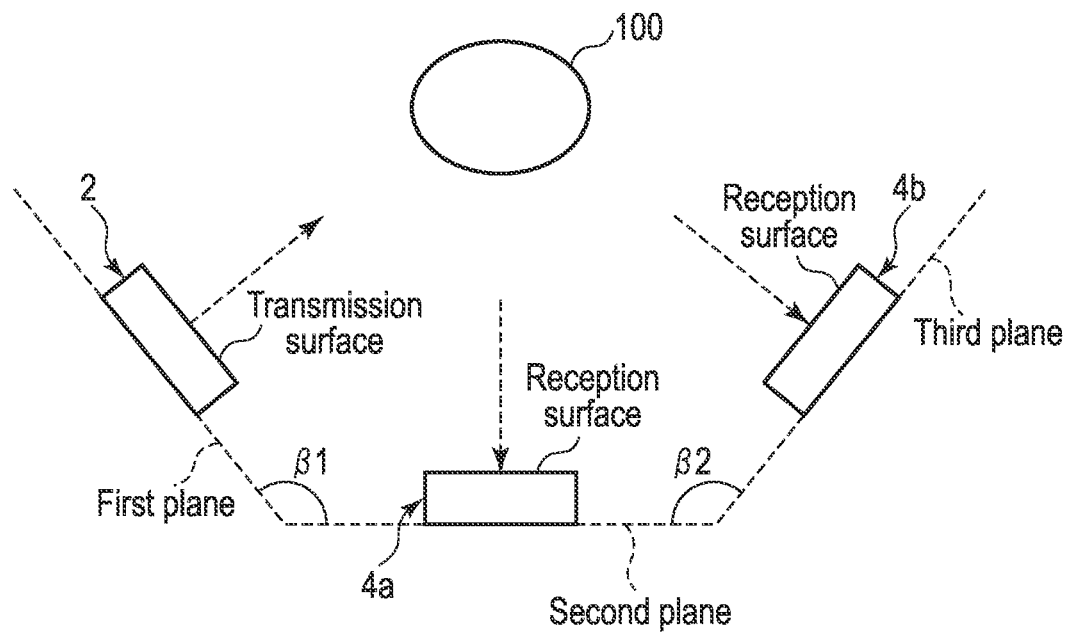
FIG. 18A and FIG. 18B illustrate a sixth example of an arrangement of at least one transmission panel and a plurality of reception panels with respect to a subject according to the embodiment.
Figure 18B:
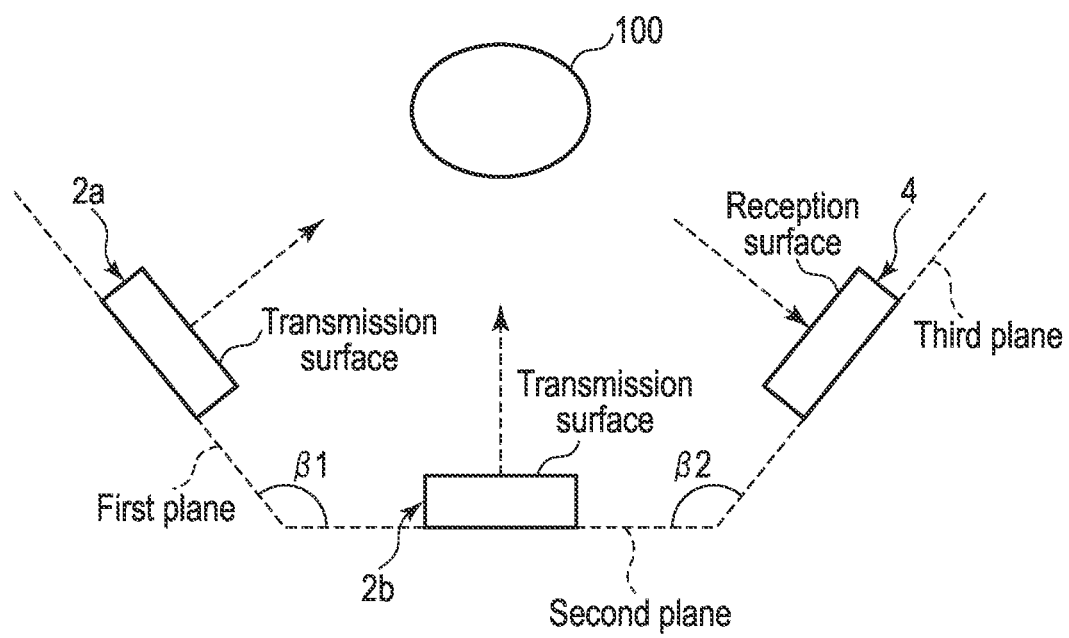
Figure 19:
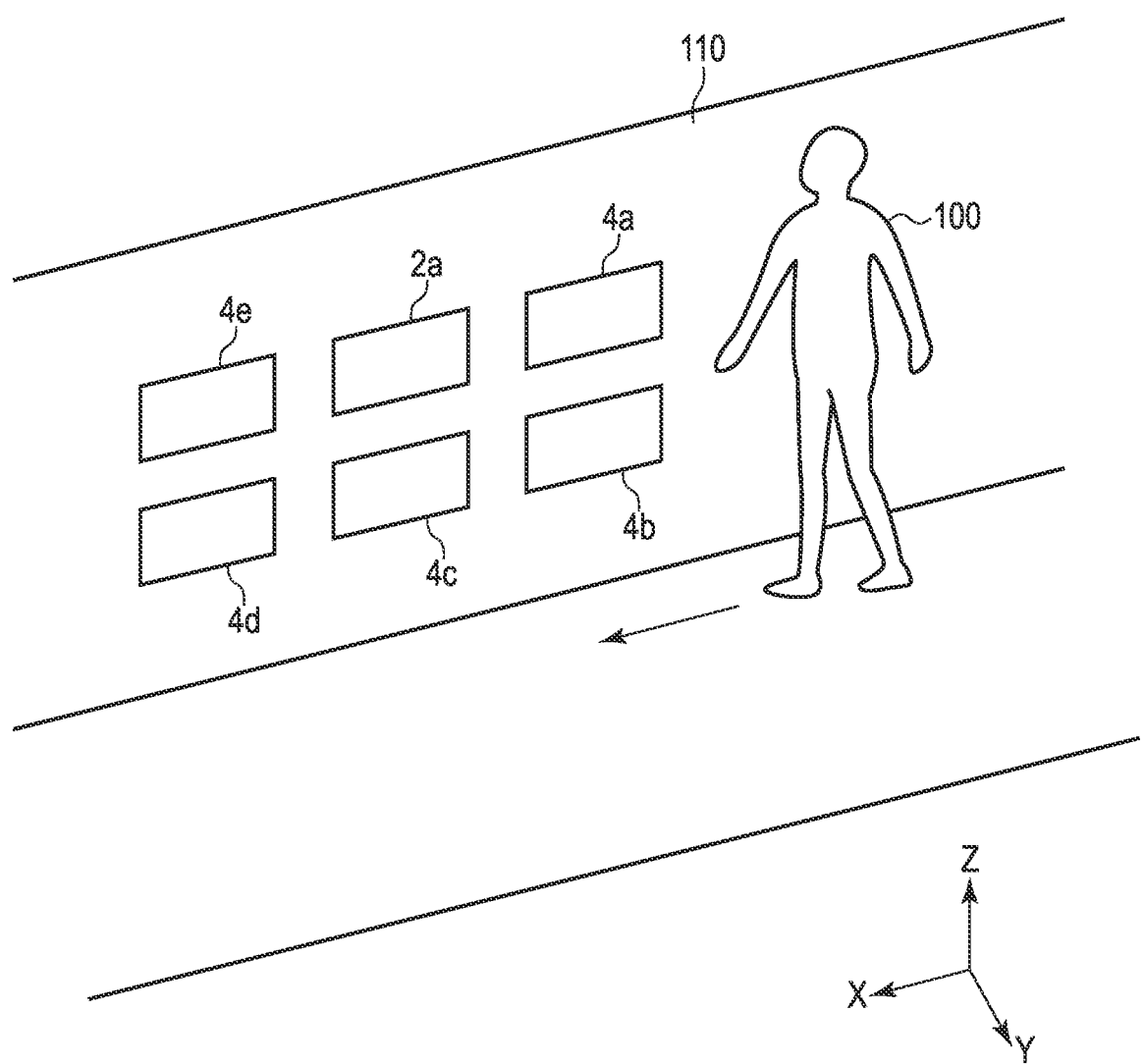
FIG. 19 illustrates a seventh example of a radar device includes at least one transmission panel and a plurality of reception panels according to the embodiment.

FIGS. 18A and 18B illustrate a sixth example of the arrangement of the transmission panel and the reception panel according to the embodiment. FIG. 18A illustrates an example in which the transmission panel 2a and two reception panels 4a and 4b are used. FIG. 18B illustrates an example in which the two transmission panels 2a and 2b and reception panel 4a are used.

In FIG. 18A, the transmission panel 2 is arranged on a first plane, the reception panel 4a is arranged on a second plane, and the reception panel 4b is arranged on a third plane. When an angle β1 formed by the first plane and second plane is larger than 0 degrees and smaller than 180 degrees, and an angle β2 formed by the second plane and third plane is larger than 0 degrees and smaller than 180 degrees, the electromagnetic waves which are radiated from the transmission surface of the transmission panel 2 and are reflected by any portion of the subject 100 are incident on the reception surface of the reception panel 4a or the reception panel 4b. Accordingly, it is possible to inspect any portion of the subject 100. The transmission surface of the transmission panel 2a and the reception surface of the reception panel 4a are positioned between the first plane and second plane. The reception surface of the reception panel 4a and the reception surface of the reception panel 4b are positioned between the second plane and third plane.

In FIG. 18B, the transmission panel 2a is arranged on the first plane, the transmission panel 2b is arranged on the second plane, and the reception panel 4 is arranged on the third plane. When the angle β1 formed by the first plane and second plane is larger than 0 degrees and smaller than 180 degrees and the angle β2 formed by the second plane and third plane is larger than 0 degrees and smaller than 180 degrees, the electromagnetic waves which are radiated from the transmission surface of the transmission panel 2a or the transmission panel 2b, and are reflected by any portion of the subject 100 are incident on the reception surface of the reception panel 4. Accordingly, it is possible to inspect any portion of the subject 100. The transmission surface of the transmission panel 2a and the transmission surface of the transmission panel 2b are positioned between the first plane and the second plane. The transmission surface of the transmission panel 2b and the reception surface of the reception panel 4a are positioned between the second plane and the third plane.

The examples illustrated in FIGS. 17A, 17B, 18A, and 18B are cases where the number of the transmission panels and the number of the reception panels are minimum. A similar configuration can be made even when the number of the transmission panels and the number of the reception panels increase. In addition, in a case where the number of the transmission panels or reception panels increases, the number of the planes may increase according to the number of the panels.

A specific example of the arrangement of the transmission panel 2 and reception panel 4 in the inspection area will be described with reference to FIGS. 19, 20, and 21. It is assumed that the inspection area is a passage of the subject 100 in the facility. FIGS. 19 to 21 are perspective views. The transmission panel 2 and the reception panel 4 may include any array antennas of FIGS. 8 to 12.

FIG. 19 is a perspective view illustrating a seventh example of the arrangement of the transmission panel 2 and the reception panel 4. At least one transmission panel 2 and a plurality of reception panels 4 or a plurality of transmission panels 2 and at least one reception panel 4 are two-dimensionally arranged on the surface of a wall 110 of the passage. FIG. 19 illustrates an example in which at least one (for example, one) transmission panel 2a and a plurality of (for example, five) reception panels 4a, 4b, 4c, 4d, and 4e are two-dimensionally arranged on the surface of the wall 110.

According to the example of FIG. 19, the reflected waves of the electromagnetic waves radiated to the subject 100 walking in the passage in various directions are received by a large number of reception panels 4a to 4e. Therefore, the entire subject 100 is inspected.

Since the transmission antenna and the reception antenna are compatible, the radar device 1 may include a plurality of transmission panels 2 and at least one reception panel 4 contrary to the example of FIG. 19.

The transmission panel 2 and the reception panel 4 may be installed not on the surface of the passage wall 110 but under the floor or on the ceiling of the passage.

FIG. 20 is a perspective view illustrating an eighth example of the arrangement of the transmission panel 2 and the reception panel 4. A plurality of (for example, three) support plates 112a, 112b, and 112c are installed on the side surface of the passage to surround the subject 100. The central support plate 112b is installed substantially parallel to the side surface of the passage, and the support plates 112a and 112c on both sides of the central support plate 112b are installed slightly inclined from the central support plate 112b to face inward. At least one (for example, two) transmission panel 2 (2a and 2b) and a plurality of (for example, six) reception panels 4a, 4b, 4c, 4d, 4e, and 4f are attached to the support plate 112a. Similarly, two transmission panels 2 and six reception panels 4 are attached to each of the other support plates 112b and 112c.

Also in the example of FIG. 20, the reflected waves of the electromagnetic waves radiated to the subject 100 walking in the passage in various directions are received by a large number of reception panels 4a to 4f. Therefore, the entire subject 100 is inspected. In the example of FIG. 20, three support plates 112a, 112b, and 112c surround the subject 100, and thus the transmission panel 2 and the reception panel 4 can be arranged closer to the subject 100.

The number of support plates 112 may be four or more. The support plate 112 may be installed under the floor or on the ceiling of the passage.

Since the transmission antenna and the reception antenna are compatible, a plurality of transmission panels 2 and at least one reception panel 4 may be attached to each of the support plates 112a, 112b, and 112c contrary to the example of FIG. 20.

FIG. 21 is a perspective view illustrating a ninth example of the arrangement of the transmission panel 2 and reception panel 4. It is assumed that the inspection area is the passage of the subject 100. Four support plates 114a, 114b, 114c, and 114d are respectively installed on four surfaces of the passage to surround the subject 100. For example, the support plate 114a is installed under the floor of the passage, the support plate 114b is installed on the ceiling of the passage, the support plate 114c is installed on the right side surface of the passage, and the support plate 114d is installed on the left side surface of the passage.

At least one (for example, two) transmission panel 2 (2a and 2b) and a plurality of (for example, ten) reception panels 4a, 4b, 4c, 4d, 4e, 4f, 4g, 4h, 4i, and 4j are attached to the support plate 114a. Similarly, two transmission panels 2 and ten reception panels 4 are attached to each of the other support plates 114b, 114c, and 114d.

According to the example of FIG. 21, the reflected waves of the electromagnetic waves radiated to the subject 100 walking in the passage in various directions are received by a large number of reception panels 4. Therefore, the entire subject 100 is inspected.

Since the transmission antenna and the reception antenna are compatible, a plurality of transmission panels 2 and at least one reception panel 4 may be attached to each of the support plates 114a to 114d contrary to the example of FIG. 21.

Figure 22:
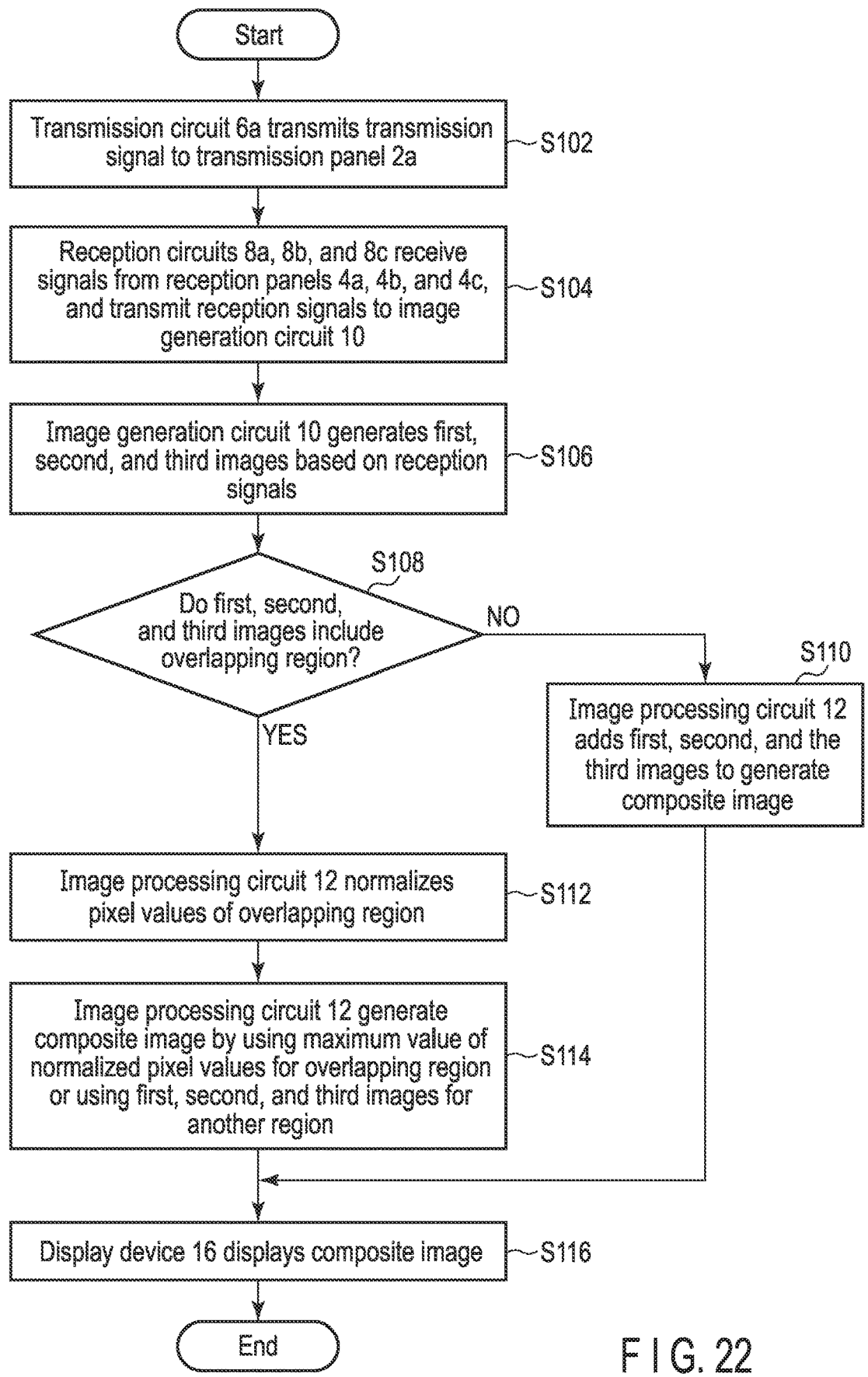
FIG. 22 is a flowchart for explaining an operation of a radar device according to the embodiment.

FIG. 22 is a flowchart for explaining the operation of the radar device 1 according to the embodiment. In FIG. 22, as illustrated in FIGS. 13 to 16, the radar device 1 includes the transmission panel 2a three reception panels 4a, 4b, and 4c.

In S102, the transmission circuit 6a transmits a transmission signal to the transmission panel 2a to radiate electromagnetic waves. The transmission circuit 6a performs beamforming to scan the subject with the electromagnetic waves under the control of the controller 14.

In S104, the reception circuits 8a, 8b, and 8c receive signals from the reception panels 4a, 4b, and 4c, respectively, and transmit the reception signals of the reception panels 4a, 4b, and 4c to the image generation circuit 10. Under the control of the controller 14, the reception circuits 8a, 8b, and 8c perform beamforming such that the reception panels 4a, 4b, and 4c respectively receive the reflected waves of the first region 100a, second region 100b, and third region 100c in FIGS. 13 and 15 or the first region 102a, second region 102b, and third region 102c in FIGS. 14 and 16.

In S106, the image generation circuit 10 generates a first image (partial image) relating to the first region based on the reception signal of the reception panel 4a, a second image (partial image) relating to the second region based on the reception signal of the reception panel 4b, and a third image (partial image) relating to the third region based on the reception signal of the reception panel 4c.

In S108, the image processing circuit 12 determines whether or not the first image, second image, and third image include an overlapping region. The image processing circuit 12 can determine whether or not the first, second, and third images include the overlapping region based on how the controller 14 controls the beamforming with respect to the reception circuits 8a, 8b, and 8c.

When the first image, second image, and third image do not include the overlapping region (NO in S108), the image processing circuit 12 adds the first image, second image, and third image to generate a composite image in S110.

When the first image, second image, and third image include the overlapping region (YES in S108), the image processing circuit 12 normalizes the pixel values of the overlapping region in S112. In S114, the image processing circuit 12 uses the maximum value of the normalized pixel values of the overlapping regions for the overlapping region, and uses the pixel values of the first image, second image, and third image for the other regions to generate a composite image.

In S116, the display device 16 displays the composite image generated by the image processing circuit 12.

The controller 14 may transmit the composite image to an external device via the communication circuit 18. The external device may determine whether the composite image includes a dangerous article, and the determination result may be obtained from the external device.

FIGS. 23 to 26 are diagrams illustrating examples of the image processing circuit 12 generating the composite image.

Figure 23:
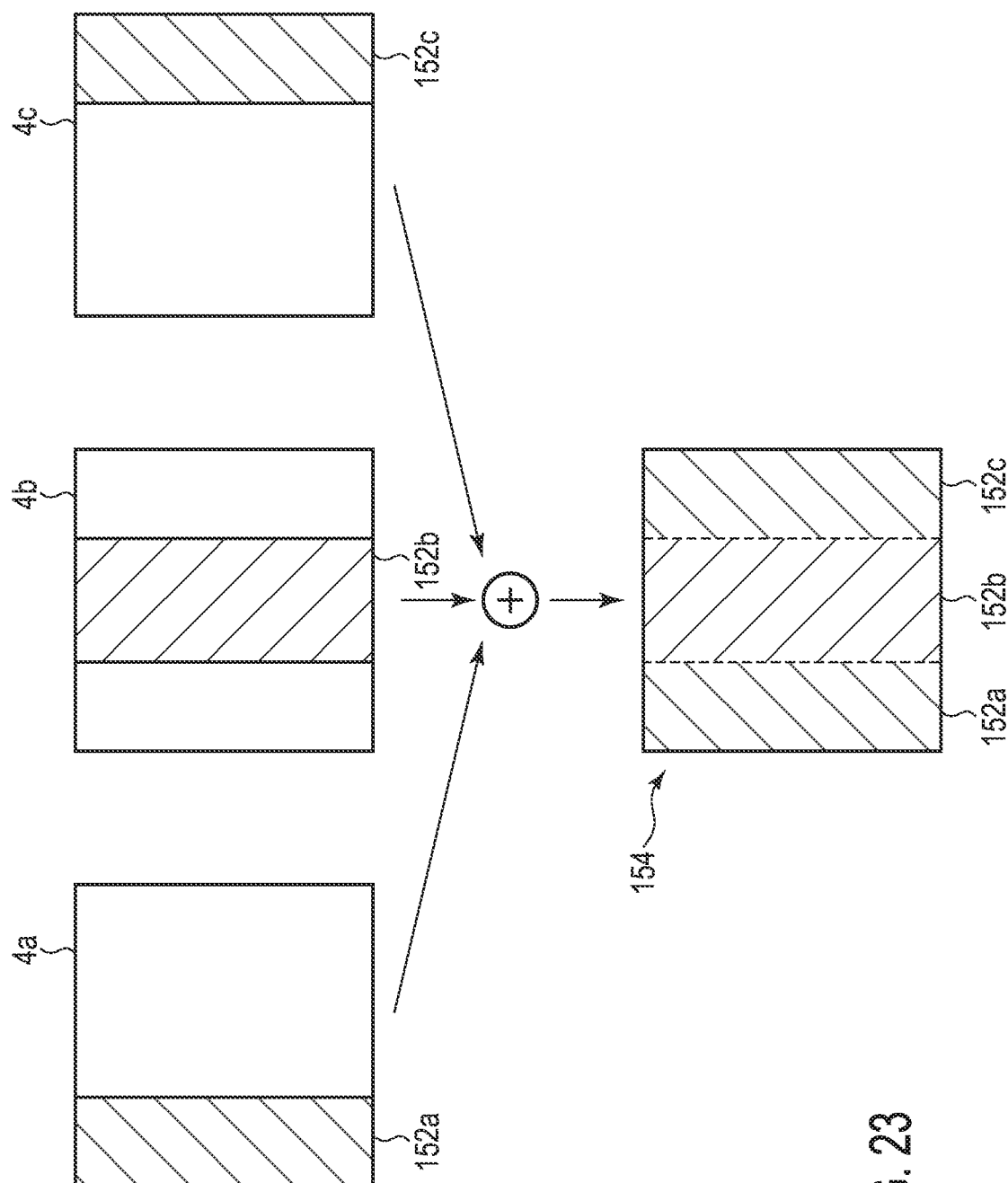
FIG. 23 is a diagram illustrating a first example of an image processing circuit generating a composite image according to the embodiment.

FIG. 23 illustrates a compositing example in a case where the transmission panel 2 and the reception panels 4a, 4b, and 4c are arranged such that the subject 100 is divided into the first region 100a, second region 100b, and third region 100c which do not include the overlapping region as illustrated in FIG. 13 or 15. The image generation circuit 10 generates a first image 152a of the first region 100a on the left side toward the subject 100 based on the reception signal of the reception panel 4a. The image generation circuit 10 generates a second image 152b of the second region 100b at the center of the subject 100 based on the reception signal of the reception panel 4b. The image generation circuit 10 generates a third image 152c of the third region 100c on the right side toward the subject 100 based on the reception signal of the reception panel 4c. Since the first image 152a, second image 152b, and third image 152c do not include an overlapping image, when the image processing circuit 12 simply adds the first image 152a, second image 152b, and third image 152c, an image 154 of the entire subject 100 is obtained.

Figure 24:
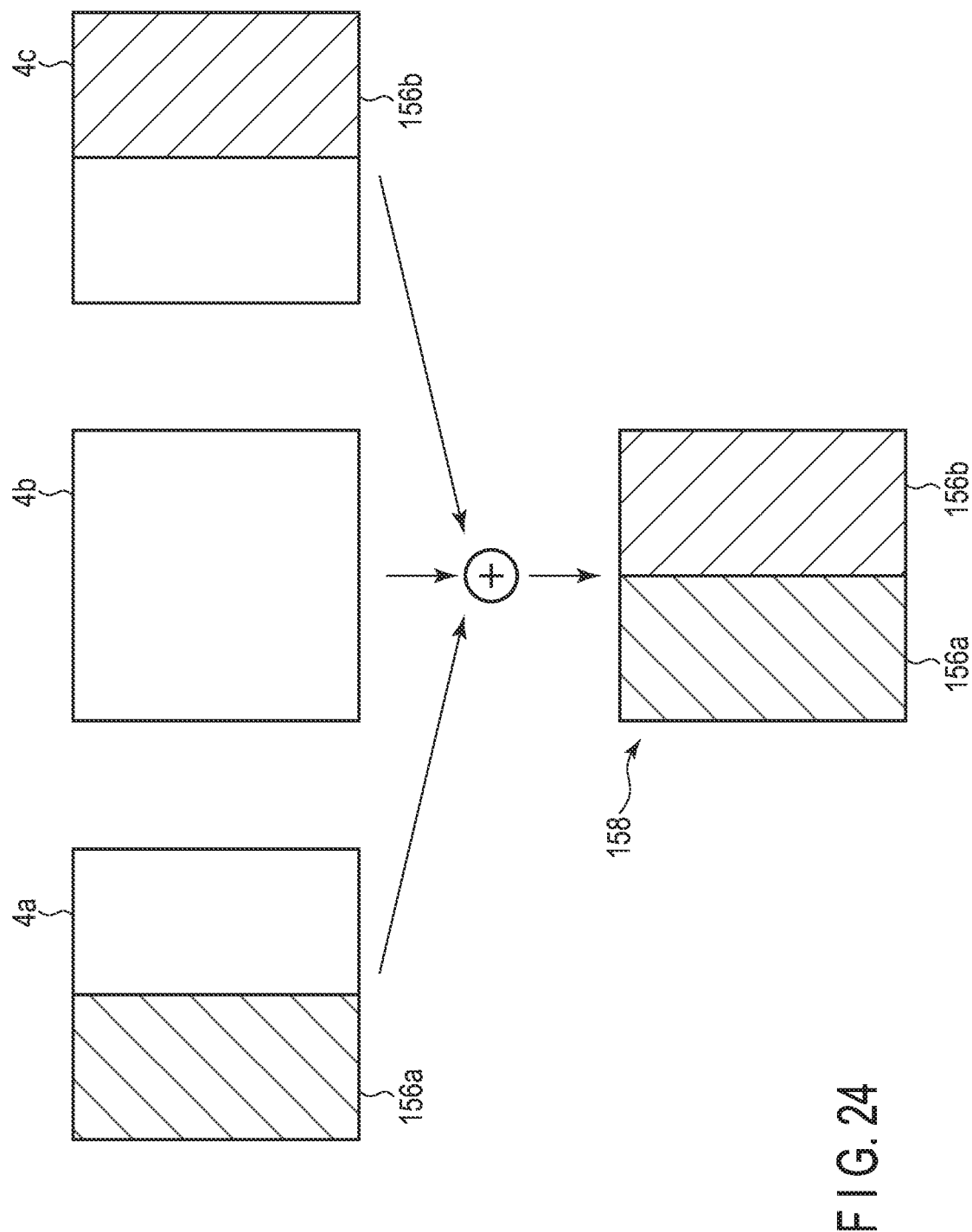
FIG. 24 is a diagram illustrating a second example of an image processing circuit generating a composite image according to the embodiment.

FIG. 24 illustrates a compositing example in a case where the transmission panel 2 and the reception panel 4 are arranged such that the subject 100 is divided into the first region and the second region not including the overlapping region as illustrated in FIG. 13 or 15. The image generation circuit 10 generates a first image 156a of the first region on the left side toward the subject 100 based on the reception signal of the reception panel 4a. The reception panel 4b does not receive the reflection waves from the subject 100, and the image generation circuit 10 generates a second image having the pixel value of 0 based on the reception signal of the reception panel 4b. The image generation circuit 10 generates a third image 156b of the second region on the right side toward the subject 100 based on the reception signal of the reception panel 4c. Since the first image 156a and the third image 156b do not include an overlapping image, when the image processing circuit 12 simply adds the first image 156a, second image, and third image 156b, an image 158 of the entire subject 100 is obtained.

Figure 25:
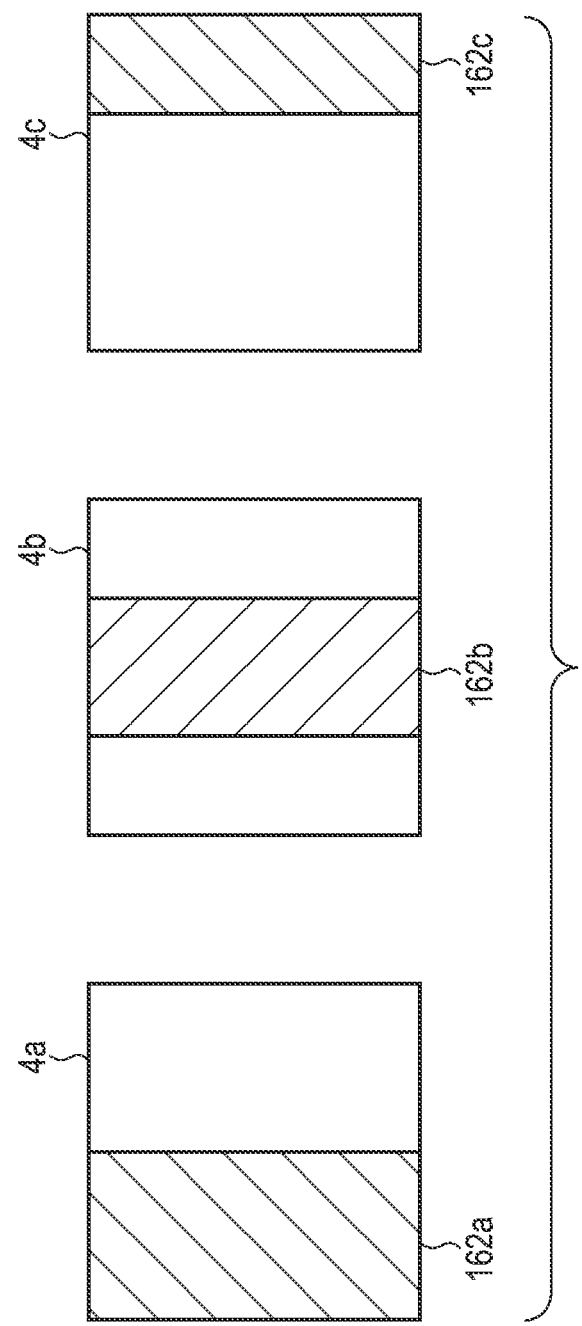
FIG. 25 is a diagram illustrating a third example of an image processing circuit generating a composite image according to the embodiment.
Figure 26:
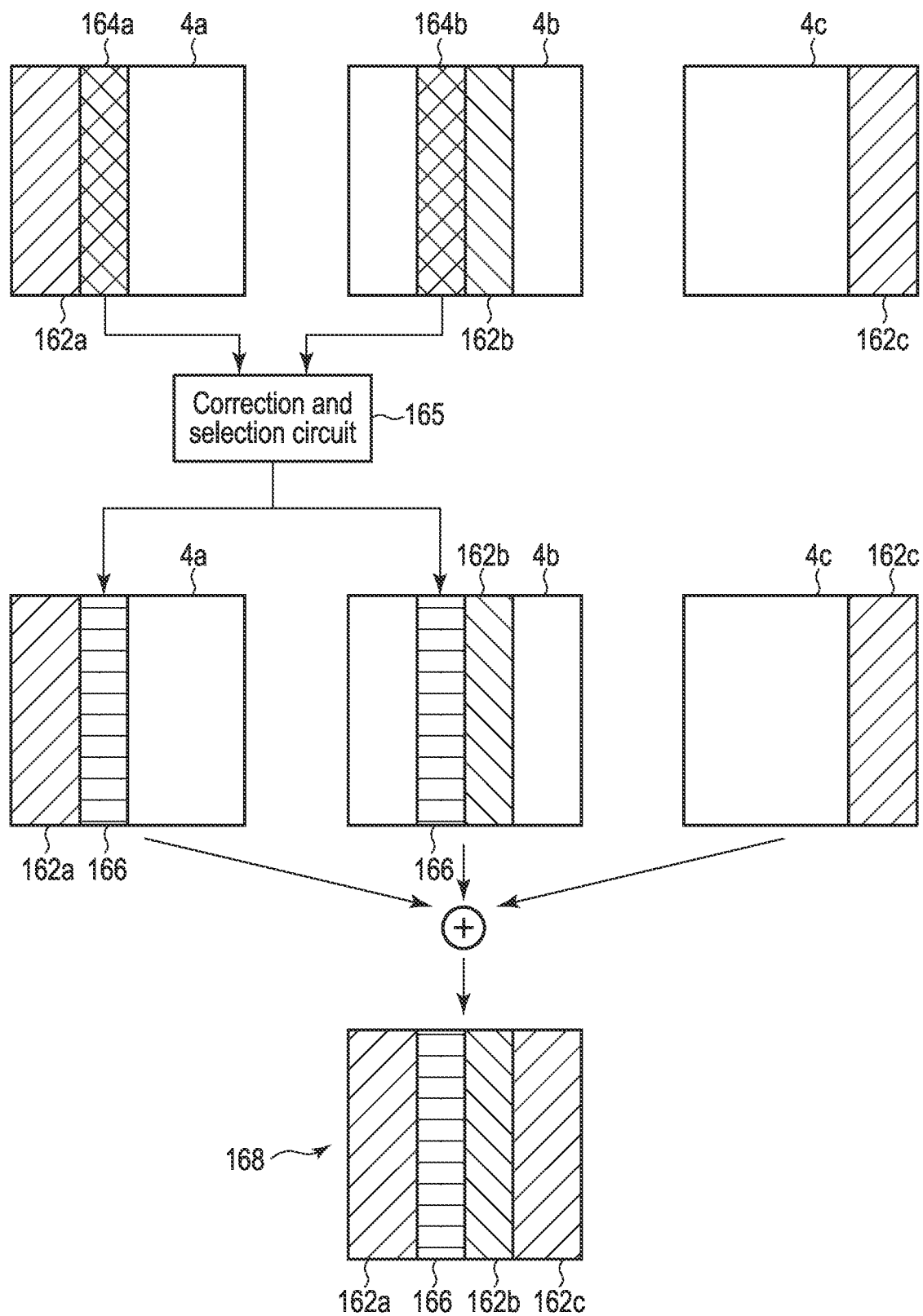
FIG. 26 is a diagram illustrating a fourth example of an image processing circuit generating a composite image according to the embodiment.

FIGS. 25 and 26 illustrate a compositing example in a case where the transmission panel 2 and the reception panel 4 are arranged such that the subject 100 is divided into the first region 102a, the second region 102b, and the third region 102c which include the overlapping region as illustrated in FIG. 14 or 16. As illustrated in FIG. 25, the image generation circuit 10 generates a first image 162a of the first region on the left side toward the subject 100 based on the reception signal of the reception panel 4a. The image generation circuit 10 generates a second image 162b of the second region at the center of the subject 100 based on the reception signal of the reception panel 4b. The image generation circuit 10 generates a third image 162c of the third region on the right side toward the subject 100 based on the reception signal of the reception panel 4c.

The first region 102a and the second region 102b include the overlapping region. For this reason, as illustrated in FIG. 26, the first image 162a of the first region includes an overlapping image 164a of the region overlapping the second region. The second image 162b of the second region includes an overlapping image 164b of the region overlapping the first region.

The pixel value of the overlapping image 164a and the pixel value of the overlapping image 164b are originally the same value, but actually may be different values since the levels of the intensities of the reflected waves received by the reception panels 4a and 4b are different. In this case, at the time of compositing, the pixel values become discontinuous in the overlapping region depending on which overlapping image is selected.

The image processing circuit 12 corrects (also referred to as normalization) any one of the first image 162a of the reception panel 4a and the second image 162b of the reception panel 4b with respect to the other. The image processing circuit 12 obtains an average value Aa of the pixel values of the overlapping image 164a and an average value Ab of the pixel values of the overlapping image 164b. When correcting the second image 162b of the reception panel 4b, the image processing circuit 12 multiplies the pixel values of the second image 162b (both the overlapping region and the non-overlapping region) by (Aa/Ab). Accordingly, the average value of the pixel values of the overlapping image 164b of the second image 162b becomes Aa (the average value of the pixel values of the overlapping image 164a of the first image 162a). Therefore, at the time of compositing, regardless of which of the overlapping images 164a and 164b is selected, the discontinuity of pixel values in the overlapping region is prevented. When correcting the first image 162a of the reception panel 4a, the image processing circuit 12 multiplies the pixel values of the first image 162a (both the overlapping region and the non-overlapping region) by (Ab/Aa). Accordingly, the average value of the pixel values of the overlapping image 164a of the first image 162a becomes Ab (the average value of the pixel values of the overlapping image 164b of the second image 162b). Therefore, at the time of compositing, regardless of which of the overlapping images 164a and 164b is selected, the discontinuity of pixel values in the overlapping region is prevented.

The image processing circuit 12 includes a circuit 165 that corrects any one of the overlapping image 164a of the first image 162a and the overlapping image 164b of the second image 162b as described above and selects the larger one of the pixel values of the corrected overlapping images 164a and 164b. The image processing circuit 12 respectively uses the first image 162a, second image 162b, and third image 162c for the first region, second region, and third region other than the overlapping region. The image processing circuit 12 uses the selected image 166 which is larger one of the pixel values of the two corrected overlapping images 164a and 164b for the overlapping region. The image processing circuit 12 generates a composite image 168 using the above images 162a, 162b, 162c, and 166. Instead of selecting the larger one of the pixel values of the corrected overlapping images for the overlapping region, the average value of the pixel values of the two corrected overlapping images may be used.

As described above, according to the radar device 1 of the embodiment, at least one transmission panel and a plurality of reception panels are arranged at positions separated from each other, or a plurality of transmission panels and at least one transmission panel are arranged at positions separated from each other. Therefore, it is possible to receive the reflected waves of the subject 100 in a large number of directions. An interval between a plurality of antennas in the transmission panel and an interval between a plurality of antennas in the reception panel are set to m times and n times a constant interval, and m and n are coprime to each other. Therefore, it is possible to improve the resolution of the radar device 1 while reducing the number of antennas of the array antenna.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A radar device comprising:
antenna panels, the antenna panels including a first transmission panel, a first reception panel, and a second reception panel, or including a first transmission panel, a second transmission panel, and a first reception panel;
wherein:
the first transmission panel includes first transmission antennas at intervals of m times a distance d, and a first transmission circuit coupled to the first transmission antennas;
the first reception panel includes first reception antennas at intervals of n times the distance d, and a first reception circuit coupled to the first reception antennas;
the distance d is substantially a half wavelength of an electromagnetic wave transmitted from the first transmission panel;
m is a positive integer of two or more;
n is a positive integer of two or more;
m and n are coprime to each other;
in a case where the antenna panels include the first transmission panel, the first reception panel, and the second reception panel:
the second reception panel includes second reception antennas at intervals of n times the distance d, and a second reception circuit coupled to the second reception antennas;
transmission by the first transmission circuit, reception by the first reception circuit, and reception by the second reception circuit are performed in synchronization;
the first transmission panel is on a first plane;
the first reception panel is on a second plane;
the second reception panel is on a third plane;
a first transmission surface of the first transmission panel and a first reception surface of the first reception panel are between the first plane and the second plane;
the first reception surface of the first reception panel and a second reception surface of the second reception panel are between the second plane and the third plane;
an angle between the first plane and the second plane is larger than 0 degrees and smaller than 180 degrees; and
an angle between the second plane and the third plane is larger than 0 degrees and smaller than 180 degrees; and
in a case where the antenna panels include the first transmission panel, the second transmission panel, and the first reception panel:
the second transmission panel includes second transmission antennas at intervals of m times the distance d, and a second transmission circuit coupled to the second transmission antennas;
transmission by the first transmission circuit, transmission by the second transmission circuit, and reception by the first reception circuit are performed in synchronization;
the first transmission panel is on a fourth plane;
the second transmission panel is on a fifth plane;
the first reception panel is on a sixth plane;
the first transmission surface of the first transmission panel and a second transmission surface of the second transmission panel are between the fourth plane and the fifth plane;
the second transmission surface of the second transmission panel and the first reception surface of the first reception panel are between the fifth plane and the sixth plane;
an angle between the fourth plane and the fifth plane is larger than 0 degrees and smaller than 180 degrees; and
an angle between the fifth plane and the sixth plane is larger than 0 degrees and smaller than 180 degrees.

2. The radar device according to claim 1, wherein:

in the case where the antenna panels include the first transmission panel, the first reception panel, and the second reception panel;
the first transmission antennas are one-dimensionally arranged;
the first reception antennas are one-dimensionally arranged; and
the second reception antennas are one-dimensionally arranged; and
in the case where the antenna panels include the first transmission panel, the second transmission panel, and the first reception panel;
the first transmission antennas are one-dimensionally arranged;
the second transmission antennas are one-dimensionally arranged; and
the first reception antennas are one-dimensionally arranged.

3. The radar device according to claim 1, wherein:
in the case where the antenna panels include the first transmission panel, the first reception panel, and the second reception panel;
the first transmission antennas are two-dimensionally arranged;
the first reception antennas are two-dimensionally arranged; and
the second reception antennas are two-dimensionally arranged; and
in the case where the antenna panels include the first transmission panel, the second transmission panel, and the first reception panel;
the first transmission antennas are two-dimensionally arranged;
the second transmission antennas are two-dimensionally arranged; and
the first reception antennas are two-dimensionally arranged.

4. The radar device according to claim 1, wherein;
in the case where the antenna panels include the first transmission panel, the first reception panel, and the second reception panel:
the first transmission antennas are one-dimensionally arranged;
the first reception antennas are two-dimensionally arranged; and
the second reception antennas are two-dimensionally arranged; and
in the case where the antenna panels include the first transmission panel, the second transmission panel, and the first reception panel;
the first transmission antennas are one-dimensionally arranged;
the second transmission antennas are one-dimensionally arranged; and
the first reception antennas are two-dimensionally arranged.

5. The radar device according to claim 1, wherein:
in the case where the antenna panels include the first transmission panel, the first reception panel, and the second reception panel;
the first transmission antennas are two-dimensionally arranged;
the first reception antennas are one-dimensionally arranged; and
the second reception antennas are one-dimensionally arranged; and
in the case where the antenna panels include the first transmission panel, the second transmission panel, and the first reception panel;
the first transmission antennas are two-dimensionally arranged;
the second transmission antennas are two-dimensionally arranged; and
the first reception antennas are one-dimensionally arranged.

6. The radar device according to claim 1, further comprising:
a processor configured to generate an image of an object, wherein:
in the case where the antenna panels include the first transmission panel, the first reception panel, and the second reception panel, the processor is operably coupled to the first reception panel and the second reception panel, and
in the case where the antenna panels include the first transmission panel, the second transmission panel, and the first reception panel, the processor is operably coupled to the first reception panel.

7. The radar device according to claim 6, wherein, in a case where a first image generated by a reception signal of the first reception circuit and a second image generated by a reception signal of the second reception circuit include an overlapping region, the processor is configured to correct a pixel value of the overlapping region of the first image or the second image based on an average value of pixel values of the first image and an average value of pixel values of the second image.

8. A method for the radar device of claim 1, the method comprising:
transmitting, by at least the first transmission panel, an electromagnetic wave to an object; and
receiving, by at least the first reception panel, an electromagnetic wave reflected by the object.

* * * * *